(12) United States Patent
Suhara et al.

(10) Patent No.: US 7,430,848 B2
(45) Date of Patent: Oct. 7, 2008

(54) MANUALLY PIVOTING GRASS COLLECTION BOX

(75) Inventors: Yasuyuki Suhara, Osaka (JP); Go Soda, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 53 days.

(21) Appl. No.: 10/584,980

(22) PCT Filed: Apr. 16, 2004

(86) PCT No.: PCT/JP2004/005511

§ 371 (c)(1), (2), (4) Date: Jul. 6, 2006

(87) PCT Pub. No.: WO2005/065442

PCT Pub. Date: Jul. 21, 2005

(65) Prior Publication Data

US 2007/0199295 A1    Aug. 30, 2007

(30) Foreign Application Priority Data

Jan. 6, 2004 (JP) .............................. 2004-001029
Feb. 6, 2004 (JP) .............................. 2004-030536

(51) Int. Cl.
*A01D 43/00* (2006.01)
*A01D 43/06* (2006.01)

(52) U.S. Cl. ...................................................... 56/202
(58) Field of Classification Search .................. 56/202, 56/203, 205, 16.6; 15/83, 79.2
See application file for complete search history.

(56) References Cited

U.S. PATENT DOCUMENTS 3,135,080 A * 6/1964 Christiansen ............... 56/15.3
3,493,987 A * 2/1970 Longnecker ................... 15/83
3,713,284 A * 1/1973 Dankel et al. ................ 56/364
4,015,406 A * 4/1977 Witt et al. .................... 56/202
4,476,668 A * 10/1984 Reilly .......................... 56/202
4,487,007 A * 12/1984 Mullet et al. ................ 56/16.6
4,637,203 A * 1/1987 Fedeli ......................... 56/202

(Continued)

FOREIGN PATENT DOCUMENTS

JP    3-43948    9/1991

(Continued)

*Primary Examiner*—Árpád Fábián-Kovács
(74) *Attorney, Agent, or Firm*—Hamre, Schumann, Mueller & Larson, P.C.

(57) ABSTRACT

The invention relates to a traveling mower including a traveling body 1 with a mower unit, and a grass collection box 22 for storing the mowed grass. The box is pivotally connected to the traveling body for switching between a grass collection posture for receiving grass and a discharge posture for discharging grass. The body 1 is provided with a posture change lever 12. The box 22 and the lever 12 are associated with each other via an interlock mechanism 44 so that the box 22 changes the posture in accordance with the manual operation of the lever 12. The change of the posture of the box 22 is performed with a small operation force that depends on the amount of the grass in the box 22. To enable this, the interlock mechanism 44 includes a switching mechanism for increasing the turning angle of the box 22, per unit operation of the lever 12, when the box 22 is empty or substantially empty and for reducing the turning angle when the box 22 holds much grass.

3 Claims, 20 Drawing Sheets

U.S. PATENT DOCUMENTS

| | | | | |
|---|---|---|---|---|
| 4,736,575 A | * | 4/1988 | Fedeli | 56/202 |
| 4,796,322 A | * | 1/1989 | Steed et al. | 15/79.2 |
| 4,836,610 A | * | 6/1989 | Doering et al. | 298/6 |
| 5,018,346 A | * | 5/1991 | Ishimaru et al. | 56/202 |
| 6,012,273 A | * | 1/2000 | Ogasawara et al. | 56/16.6 |
| 6,513,312 B1 | * | 2/2003 | Ishimori et al. | 56/203 |
| 6,591,596 B2 | * | 7/2003 | Mauzizio et al. | 56/16.6 |
| 6,595,737 B1 | * | 7/2003 | Parish | 414/519 |
| 6,766,633 B2 | * | 7/2004 | Wanie et al. | 56/202 |
| 7,219,489 B2 | * | 5/2007 | Tada et al. | 56/202 |

FOREIGN PATENT DOCUMENTS

| | | |
|---|---|---|
| JP | 5-76230 | 3/1993 |
| JP | 2001-45829 | 2/2001 |

* cited by examiner

MANUALLY PIVOTING GRASS COLLECTION BOX

TECHNICAL FIELD

The present invention relates to a traveling mower which includes a mowing mechanism (mower unit) for mowing grass on the ground.

BACKGROUND ART

Generally, a traveling mower includes a mower unit mounted to a traveling body to be movable up and down, and a grass collection box having a front opening communicating with a discharge duct extending rearward from the mowing unit. An example of such traveling mower is disclosed in JP-A-2001-45829. The disclosed mower includes a grass collection box which is pivotable for switching between a grass collection posture for receiving the mowed turf grass and a discharge posture for discharging the collected turf grass.

In the conventional traveling mower, the switching of the posture of the grass collection box is performed by the driving of a hydraulic cylinder mounted on the traveling body. The hydraulic system including a hydraulic pump and a hydraulic pipe has a complicated structure and increases the number of parts, which leads to an increase in size and manufacturing cost of the mower. Further, by the hydraulic driving, the posture of the grass collection box cannot be changed smoothly when the grass collection box is empty or substantially empty although the weight of the grass collection box in such a state is small.

As compared to the above, a structure designed to manually change the posture of the grass collection box is advantageous in that the mechanism for turning the grass collection box can be simplified.

However, when the mechanism is so designed that the posture of the grass collection box is changeable by the application of an operational force corresponding to the rotation load of the grass collection box in the empty or substantially empty state, the posture change of the grass collection box in the state of containing much turf grass requires a large operational force, and the turning operation becomes a burden on the operator. On the other hand, when the mechanism is so designed that the posture of the grass collection box is changeable by the application of an operational force corresponding to the rotation load of the grass collection box in the state of containing much turf grass, the grass collection box in the empty or substantially empty state turns easily and largely changes its posture even by the application of a small operational force so that the impact due to the posture change is large. In this way, the conventional structure for manually changing the posture of the grass collection box has a drawback that the operational force for changing the posture cannot be adjusted correspondingly to the presence or absence of turf grass or the amount of turf grass.

It is, therefore, a first object of the present invention to solve the above-described problems and provide a traveling mower which has a simple structure and is capable of reliably adjusting the operational force for the posture change of the grass collection box depending on the presence or absence of turf grass or the amount of turf grass in the grass collection box.

To reduce the weight, the above-described conventional grass collection box, which is capable of turning for switching between the grass collection posture and the discharge posture, is made up of a support frame as the framework, a bottom plate defining the bottom of the support frame, and a bag made of a net for covering the frame and the bottom plate.

In the conventional structure, the bottom plate of the grass collection box is fixed to the support frame. Therefore, when the support plate strikes against a curb or the ground during the mowing operation or traveling, the external force due to the impact (upward load) acts on the bottom plate or the support frame as it is, whereby the bottom plate or the support frame may be deformed or broken.

It is, therefore, a second object of the present invention to provide a traveling mower which is capable of preventing the grass collection box from deforming or breaking when the bottom plate of the grass collection box strikes against a curb, for example.

DISCLOSURE OF THE INVENTION

According to a first aspect of the present invention, there is provided a traveling mower comprising a traveling body provided with a mowing mechanism, a grass collection box for storing turf grass mowed by the mowing mechanism, the grass collection box being connected to the traveling body pivotally for switching between a grass collection posture for receiving turf grass and a discharge posture for discharging turf grass, the traveling body being provided with a manual operation member, the grass collection box and the manual operation member being associated with each other via an interlock mechanism so that the grass collection box changes the posture in accordance with the operation of the manual operation member. The interlock mechanism includes switching mechanism for increasing the angle of turning of the grass collection box per unit quantity of operation of the manual operation member when the grass collection box is empty or substantially empty and reducing the angle of turning when the grass collection box contains much turf grass.

With such a structure, in turning the grass collection box for switching between the grass collection posture and the discharge posture, the angle of turning of the grass collection box per unit quantity of operation of the manual operation member automatically increases when the grass collection box is empty or substantially empty and decreases when the grass collection box contains much turf grass. Therefore, when the grass collection box is empty or substantially empty, the posture change of the grass collection box can be performed with a small operational force corresponding to the light weight of the collection box. Even when the grass collection box contains much turf grass, the posture of the grass collection box can be changed easily and smoothly with a small operational force.

In this way, the posture changing operation of the grass collection box by the manual operation member can be performed with a small operational force in accordance with the presence or absence of turf grass or the amount of turf grass in the grass collection box. Therefore, the burden on the operator can be reduced considerably, and the operability of the traveling mower is enhanced.

In the above-described first aspect, the interlock mechanism may include an arm link for turning the grass collection box. The point at which the operation force of the manual operation member is applied relative to the arm link may be moved by the switching mechanism toward the rotation center of the arm link when the grass collection box is empty or substantially empty and moved away from the rotation center of the arm link when the grass collection box contains much turf grass. With such an arrangement, the structure of the switching mechanism can be simplified, and the size and weight can be reduced.

According to the second aspect of the present invention, in addition to the first aspect, the grass collection box comprises a support frame providing a framework of the grass collection box, a support plate defining the bottom surface of the grass collection box, and a bag made of a net or cloth and covering the support frame and the support plate. An end of the support plate which is closer to an opening of the grass collection box is pivotably connected to the support frame, whereas another end of the support plate is connected to the support frame via a buffer which resists against the pivotal movement of the support plate.

With such a structure, the buffer connecting the support frame and the second end of the support plate to each other allows the support plate to turn relative to the support frame. Therefore, even when the support plate strikes against a curb or the ground during the mowing operation or traveling so that an impact force is exerted on the support plate, the support plate can escape by turning upward correspondingly to the direction of the impact force. Therefore, the impact force acting on the support plate can be eliminated or lessened.

In this way, by the provision of such a support plate, the bottom surface of the grass collection box is reliably supported even when the grass collection box contains much turf grass, and the possibility of deformation or breakage of the support plate or the support frame is considerably reduced to enhance the durability of the grass collection box.

In the structure according to the second aspect, the buffer may be a spring having elasticity. In such a case, the structure is simple, is unlikely to break down and requires only a small number of parts, which leads to reduction in manufacturing cost.

BEST MODE FOR CARRYING OUT THE INVENTION

Preferred embodiments of the present invention will be described below with reference to the accompanying drawings.

Figure 1:
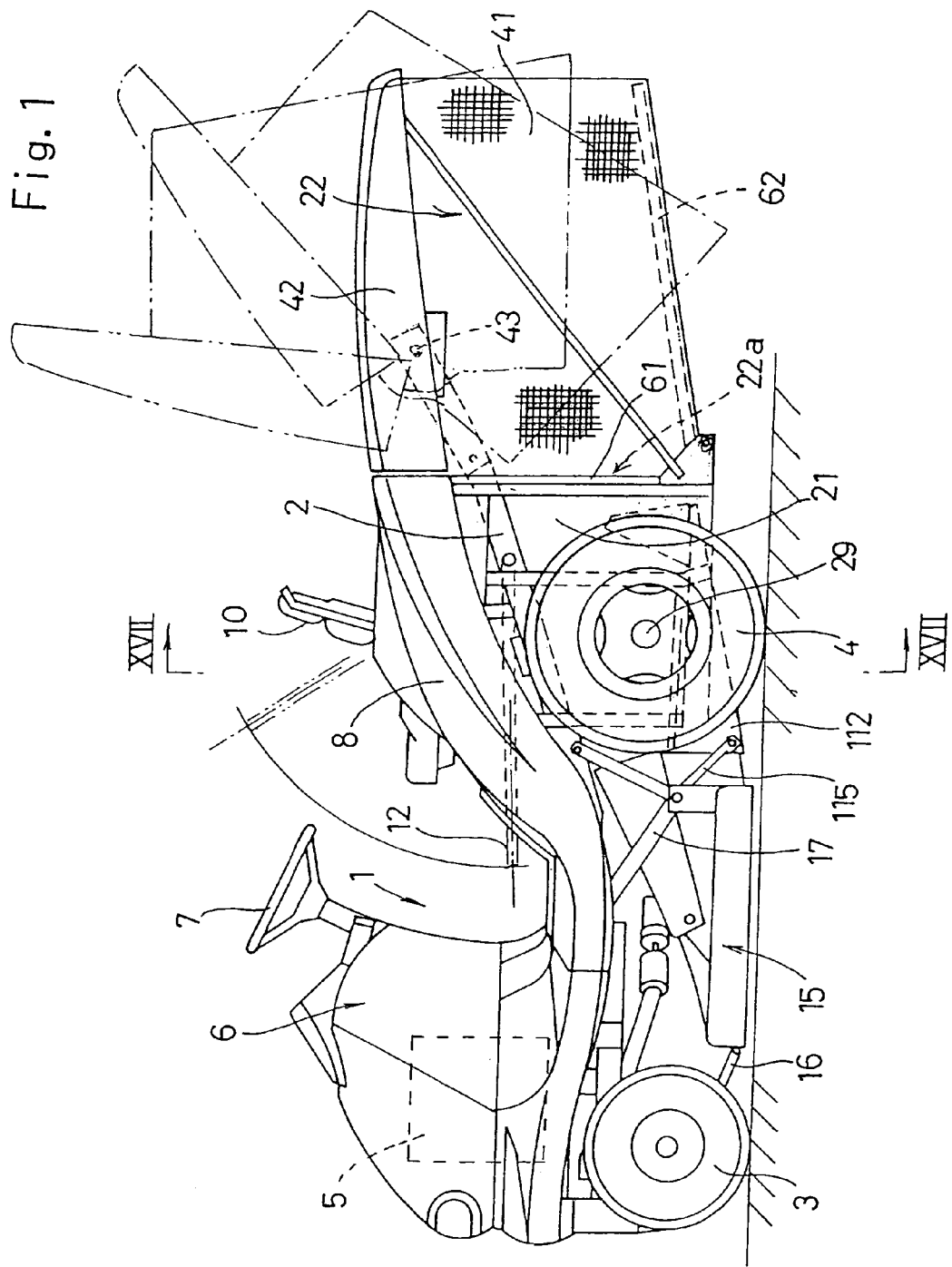
FIG. 1 is an overall side view of a mower.
Figure 2:
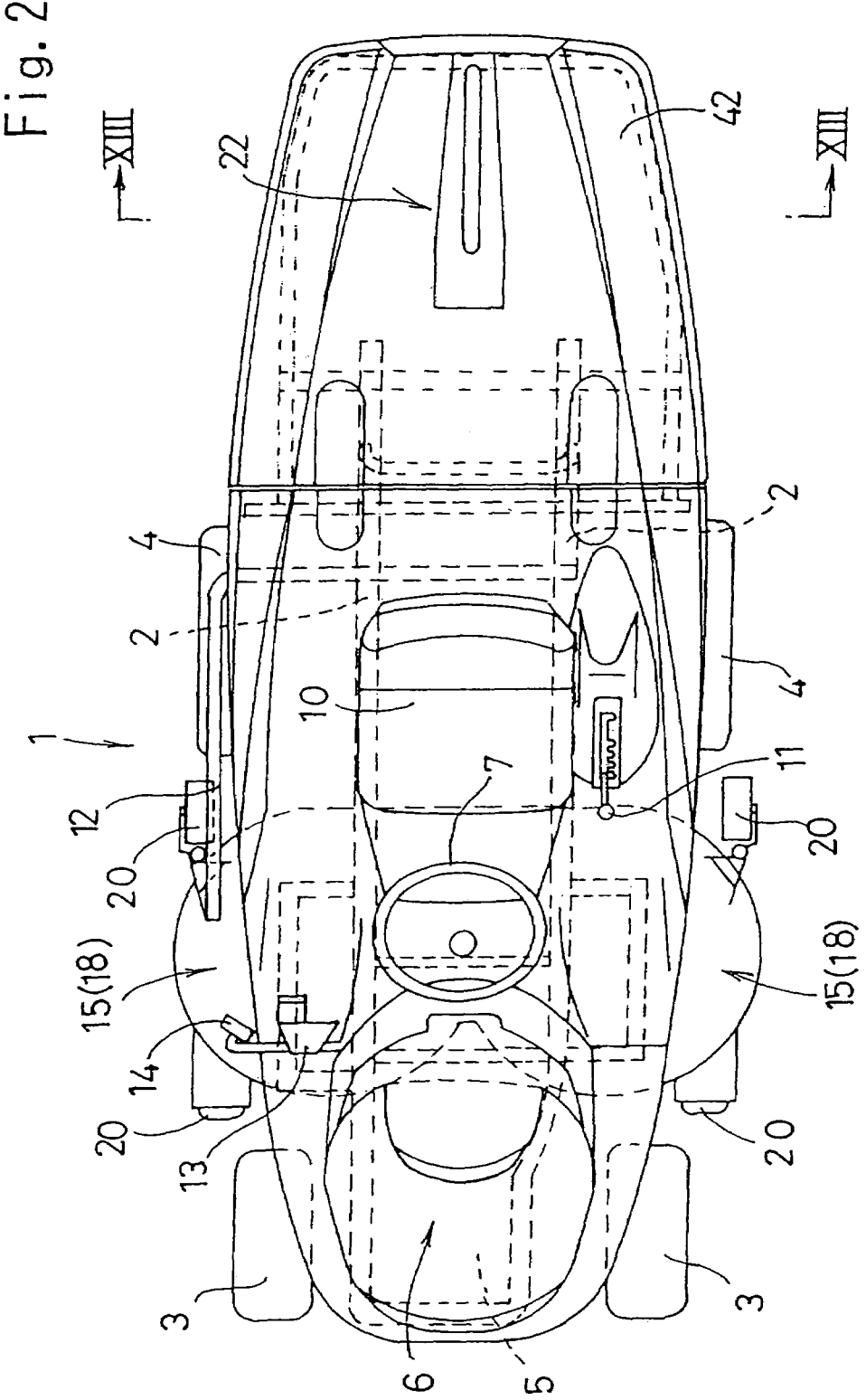
FIG. 2 is an overall plan view of the mower.

Referring first to FIGS. 1 and 2, the traveling mower will be described below.

As shown in FIGS. 1 and 2, the mower of this embodiment includes a traveling body 1 which includes a body frame 2 which is generally body-shaped in plan view. The body frame 2 is supported, on opposite sides thereof, by a pair of front wheels 3, 3 and a pair of rear wheels 4, 4.

At a front portion of the traveling body 1, an engine 5 as a power source and an operation column 6 provided with a steering control wheel 7 are mounted. A rear portion of the upper surface of the traveling body 1 is covered by a rear cowl 8. In the rear cowl, a transmission case 9 of e.g. HST (hydraulic stepless transmission) type is arranged for appropriately changing the rotational speed of the engine 5 for transmission to the rear wheels 4, 4 (see FIG. 3).

A driver's seat 10 is provided on the rear cowl 8. When the operator sitting on the driver's seat operates the steering control wheel 7 to turn the wheel, the steering angle (orientation angle) of the two front wheels 3, 3 changes in accordance with the operation amount (degree of turning). A mower lifting lever 11 which is pivotable back and forth to move up and down a mower unit 15, which will be described later, is provided on the left side of the driver's seat 10. On the right side of the driver's seat 10, a posture change lever 12 as a manual operation member for changing the posture of a grass collection box 22 is provided to be pivotable up and down. A speed change pedal 13 for appropriately changing the vehicle speed and a brake pedal 14 for braking the traveling body 1 are so provided as to stand on the rear (back) side of the operation column 6.

The mower unit 15 as a mowing mechanism, which is movable up and down, is mounted, via a front and a rear link bars 16 and 17, to the lower surface of the body frame 2 between the front wheels 3, 3 and the rear wheels 4, 4. The mower unit 15 includes a mower case 18 in the form of a downwardly-open bowl, and a pair of rotary cutters 19, 19 provided in the mower case 18 to be rotatable horizontally (see FIG. 3).

Four gauge wheels 20 for controlling the height of the mower unit 15 in lowering the mower unit are mounted on opposite sides at the front and the rear ends of the mower case 18. A duct portion extends rearward from the mower case 18 to communicate with the grass collection box 22 arranged at the back of the traveling body 1 through a discharge duct 21 arranged on the lower surface of the body frame 2 between the rear wheels 4, 4.

When the mower unit 15 rotates each of the rotary cutters 19 with the cutter kept groveling on the ground, the turf grass on the ground are mowed into an appropriate height. The turf grass mowed by the rotary cutters 19 are collected from the mower unit 15 into the grass collection box 22 through the discharge duct 21.

Figure 3:
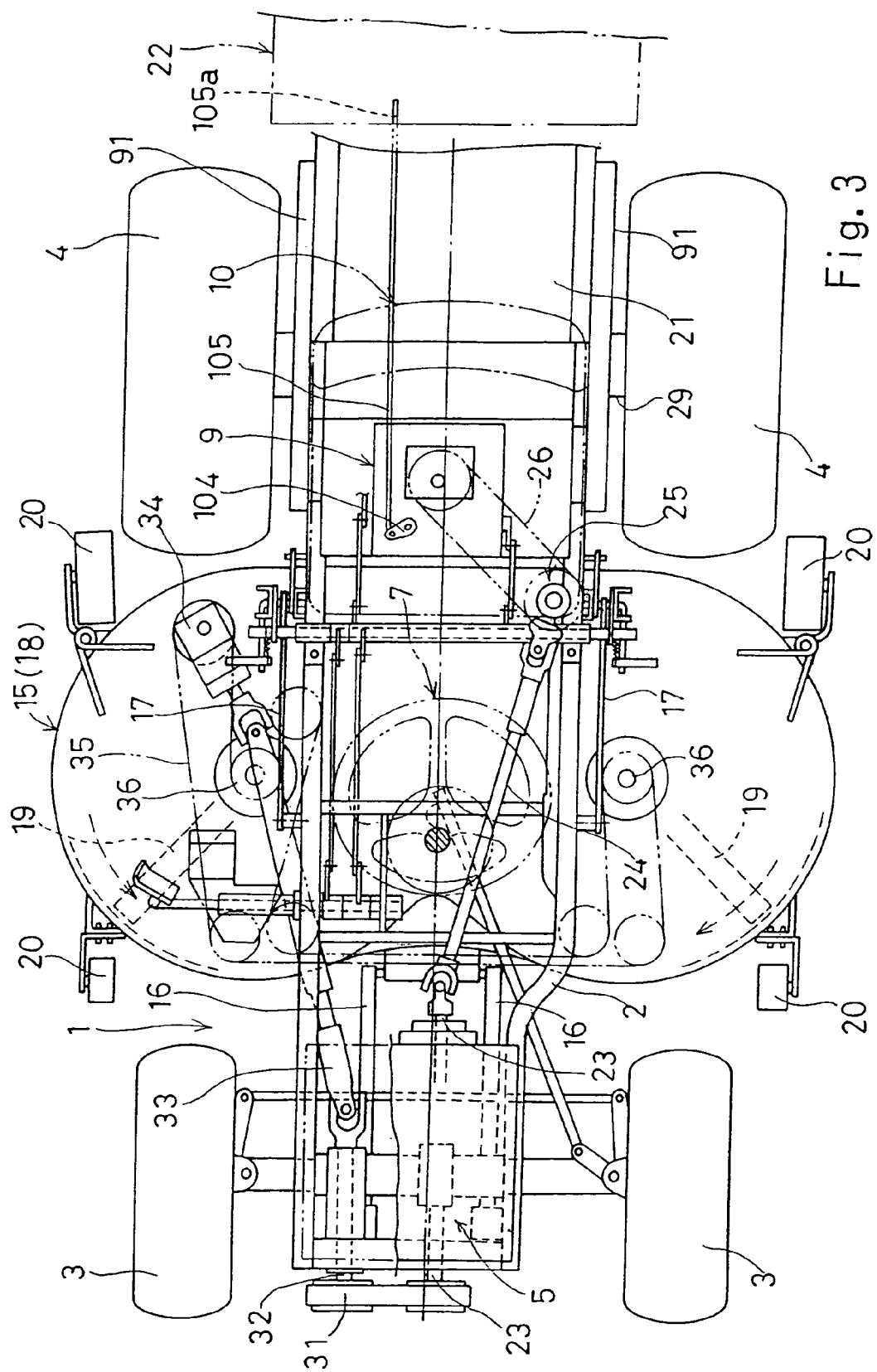
FIG. 3 is a plan view showing the power transmission system of the mower.

Referring mainly to FIG. 3, the power transmission system of the mower will be described. The mower in this embodiment employs a two-wheel drive system in which part of the rotation power of the engine 5 is distributed to the two rear wheels 4, 4.

Specifically, part of the rotation power of the engine 5 is transmitted from the rear end of an output shaft 23 projecting forward and backward from the engine 5 to the transmission case 9 via a propeller shaft 24 provided with universal joints at opposite ends thereof, a travel gear box 25 arranged in front of the transmission case 9 and an endless belt 26. The power is then transmitted from a cross shaft 27 projecting laterally outward from the transmission case 9 to a laterally-extending rear wheel drive shaft 29 provided at a rear portion of the traveling body 1 via an endless chain 28 (see FIG. 17). As a result, the rear wheels 4, 4 mounted to opposite sides of the rear wheel drive shaft 29 are driven for rotation.

The other part of the rotation power of the engine 5 is transmitted from the front end of the output shaft 23 to a PTO shaft 32 supported at a front portion of the body frame 2 via an endless band 31 such as a power transmission belt. Subsequently, the power is transmitted from the PTO shaft 32 to vertically extending rotary shafts 36, 36 rotatably supported in the mower case 18 and at opposite sides of the body frame 2 via an intermediate shaft 33 provided with universal joints at opposite ends thereof, and then via a mower gear box 34 and an endless belt 35 arranged on the upper surface of the mower case 18 on the right side of the body frame 2. With such an arrangement, the left rotary cutter 19 rotates clockwise as viewed in plan, whereas the right rotary cutter 19 rotates counterclockwise as viewed in plan. The rotation of the two rotary cutters 19, 19 produces a transferring wind that blows backward from the mower case 18 toward the grass collection box 22. The transferring wind smoothly transfers the turf grass mowed by the rotary cutters 19 into the grass collection box 22.

Figure 4:
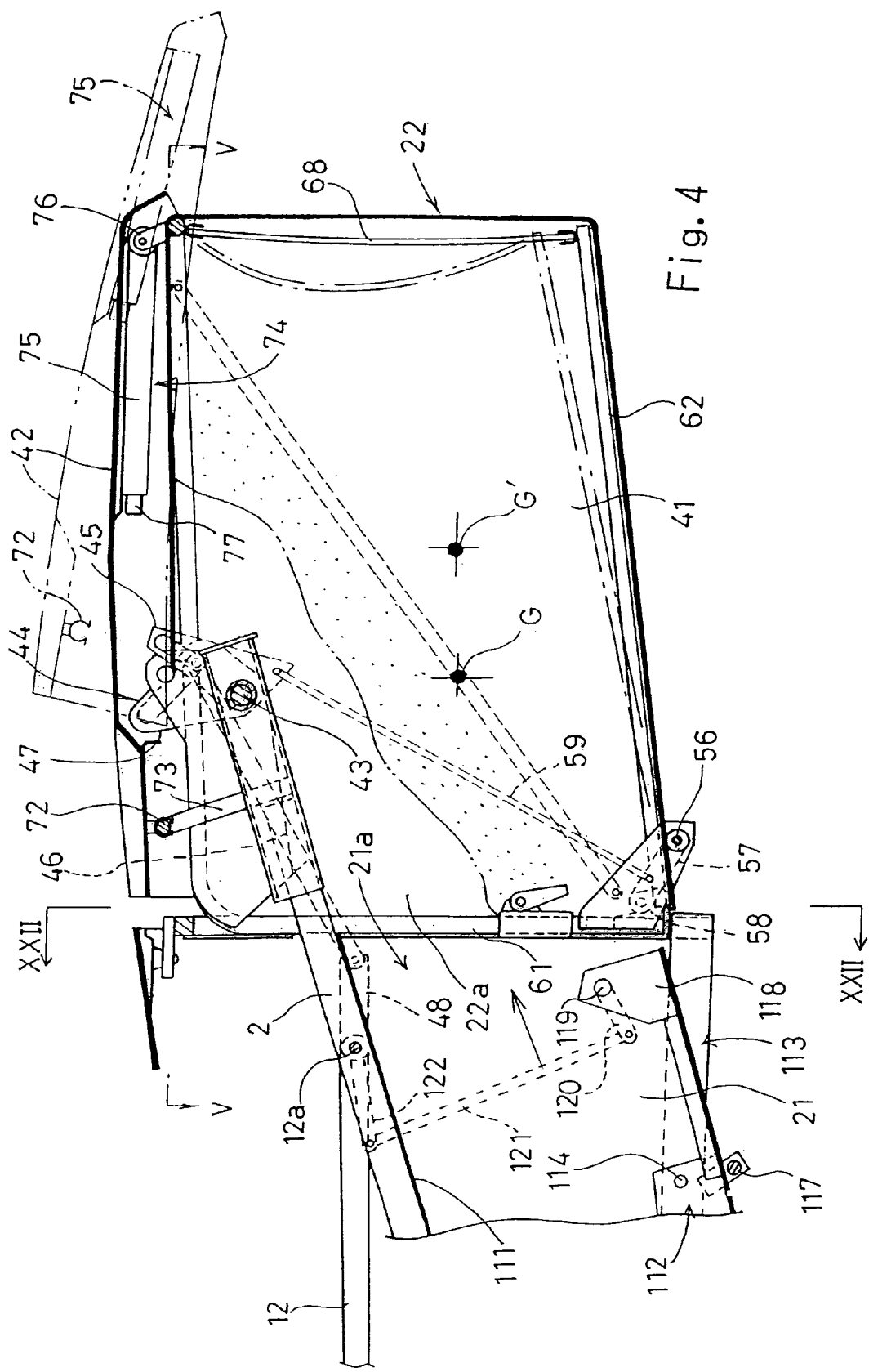
FIG. 4 is a side sectional view showing the connection structure of a body frame and a grass collection box.
Figure 5:
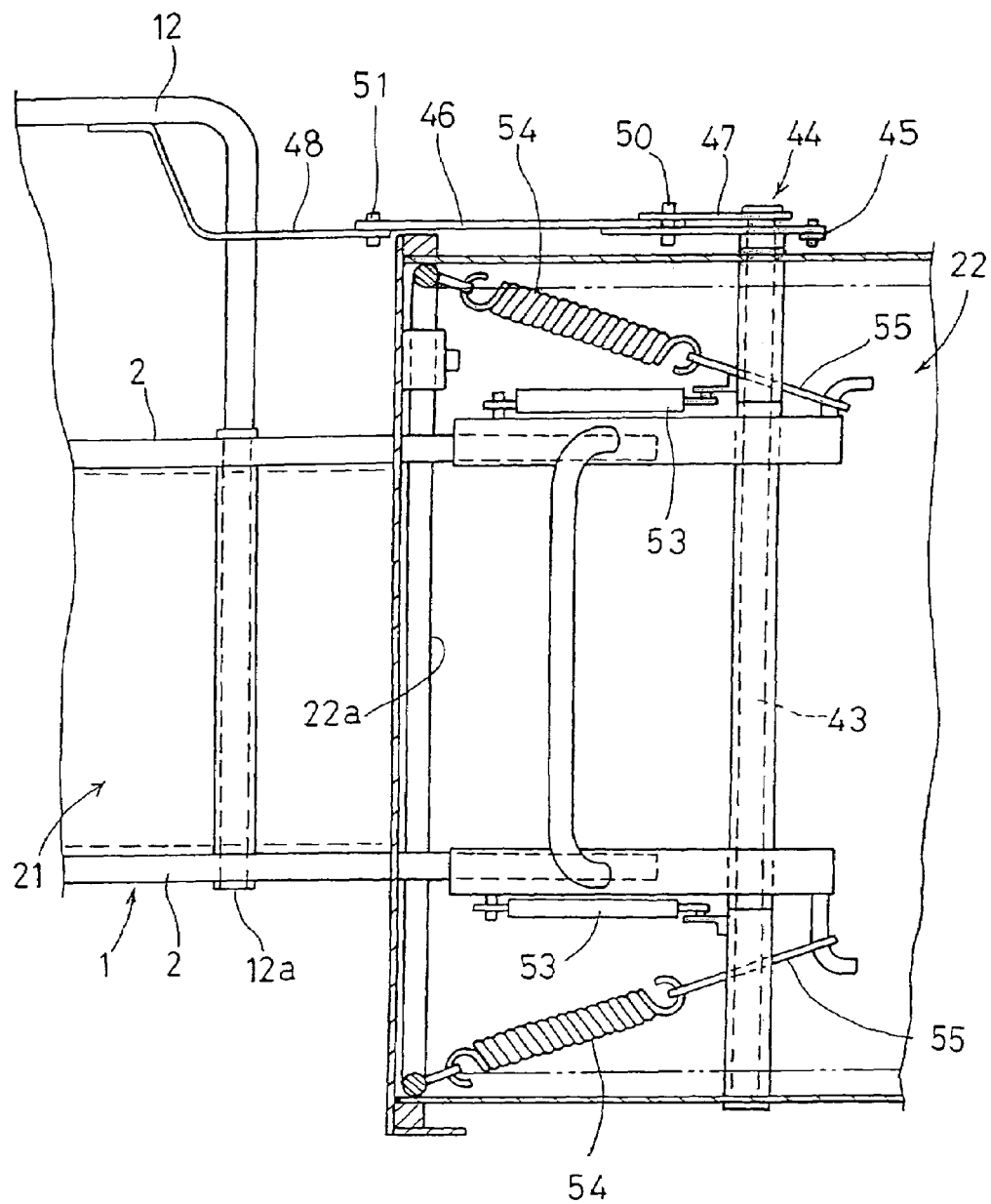
FIG. 5 is an enlarged sectional view taken along lines IV-IV in FIG. 4.
Figure 6:
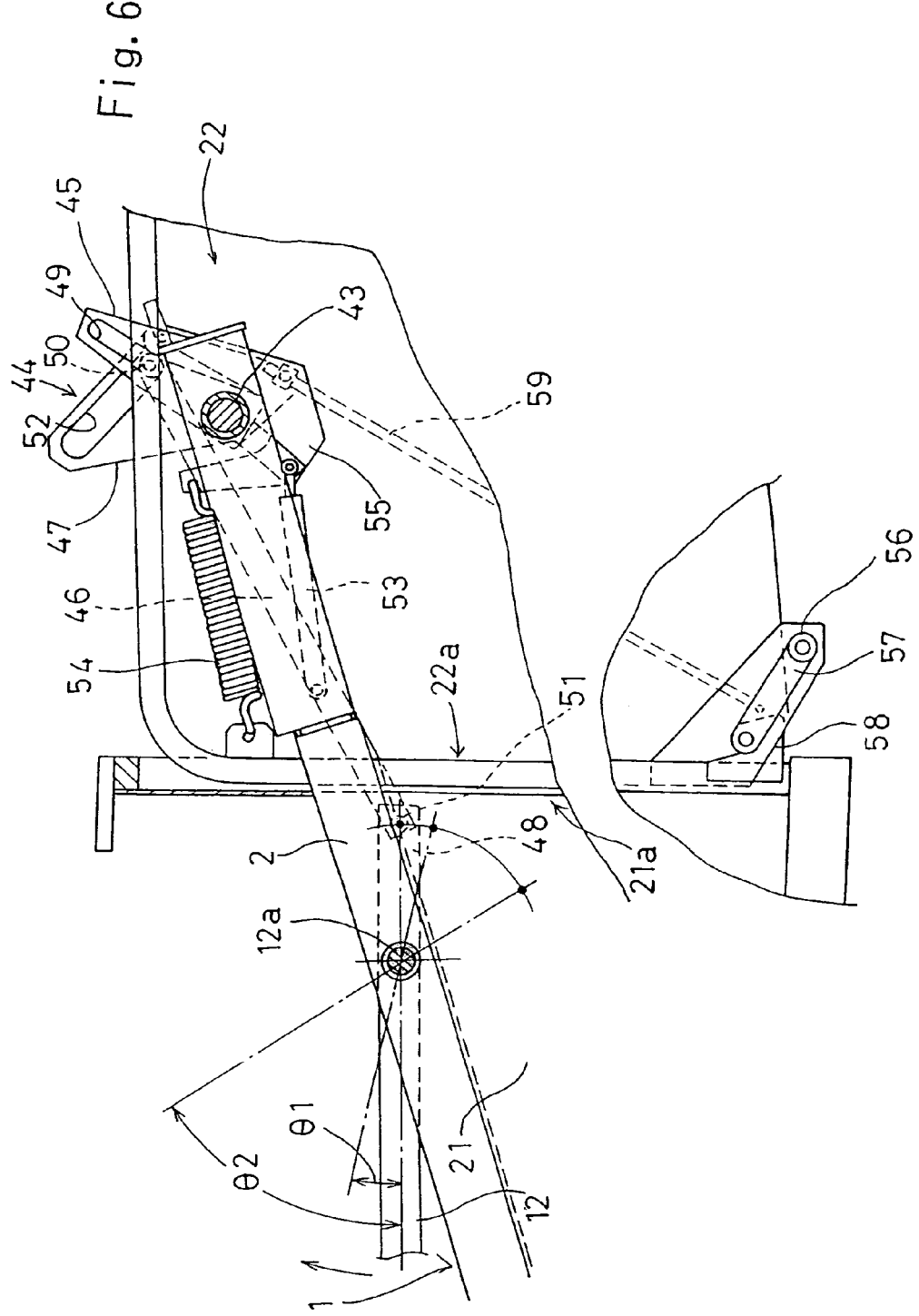
FIG. 6 is an enlarged side sectional view of FIG. 4.

Referring mainly to FIGS. 4-6, the connection structure of the body frame 2 and the grass collection box 22 will be described.

The grass collection box 22 is generally in the form of a box which opens forward. The grass collection box 22 is covered by a bag 41 made of a net or cloth except for the introduction port 22a (front opening). On the upper surface of the grass collection box 22, a lid cover 42 is mounted to prevent dust passed through the mesh of the bag 41 from moving toward the traveling body 1.

Of the upper surface of the grass collection box 22, a portion closer to the introduction port 22a (to the front opening of a support frame 61, which will be described later) is fastened to a horizontal lateral support shaft 43 rotatably supported at a rear end of the body frame 2. With such a structure, the grass collection box 22 is allowed to pivot up and down about the lateral support shaft 43. By the pivotal movement, the posture of the grass collection box is changeable between a grass collection posture (for receiving the turf glass mowed by the mower unit 15, which is indicated by solid lines in FIG. 1) in which the introduction port 22a faces a discharge port 21a of the discharge duct 21, a discharge posture in which the introduction port 22a is oriented obliquely downward (indicated by single-dashed lines in FIG. 1), and a complete discharge posture in which the introduction port 22a faces the ground (indicted by double-dashed lines in FIG. 1).

An end of the lateral support shaft 43 is connected, via an interlock mechanism 44, to a horizontal shaft portion 12a of the posture change lever 12, which is pivotally supported by the body frame 2. Therefore, the lateral support shaft 43 turns in accordance with the up-and-down pivoting operation of the posture change lever 12.

The interlock mechanism 44 includes a triangular arm 45 pivotally attached to the end of the lateral support shaft 43, a generally bar-shaped connection rod 46 connecting the triangular arm 45 and a first transmission arm 48 fixed to the posture change lever 12, and an arm link 47 fixed to the end of the lateral support shaft 43 at a portion outward of the triangular arm 45.

In this embodiment, a connection pin 50 is slidably and unremovably fitted in an elongated groove 49 formed in the triangular arm 45 via a through-hole formed at an end of the connection rod 46, whereby the end of the connection rod 46 is connected to the triangular arm 45. The other end of the connection rod 46 is pivotally attached to the first transmission arm 48 via an attachment pin 51.

The connection pin 50, which connects the triangular arm 45 and the connection rod 46 to each other, is also slidably and unremovably fitted in an elongated groove 52 formed in the arm link 47. With such an arrangement, in accordance with the up-and-down pivoting operation of the posture change lever 12, the triangular arm 45, the arm link 47 and the lateral support shaft 43 turn together, with the lateral support shaft 43 being the rotation center.

In this embodiment, the interlocking arrangement for connecting the posture change lever 12 to the triangular arm 45 and the arm link 47 via the connection rod 46 by using the connection pin 50 corresponds to the switching mechanism set forth in claims 1 and 2.

As shown in FIGS. 5 and 6, a pair of compression springs 53 for biasing the grass collection box 22 for pivotal movement in a direction for the discharge posture is provided symmetrically between the lateral support shaft 43 and the rear end of the body frame 2.

At the rear end of the body frame 2, fulcrum-crossing links 55, each of which is arcuate to avoid the lateral support shaft 43, are provided symmetrically. A tension spring 54 is provided to bridge between each of the fulcrum-crossing links 55 and an upper portion of the front end of the grass collection box 22 (each of support posts 63 of the support frame 61, which will be described later).

When the grass collection box is in the forward, grass collection posture, the biasing force of the paired tension springs 54 is smaller than that of the compression springs 53. When the grass collection box 22 is turned from the grass collection posture to the obliquely downward discharge posture, the two tension springs 54 move over the lateral support shaft 43. Thereafter, the tension springs 54 bias the grass collection box 22 to turn the grass collection box into the downward, complete discharge posture.

A latch shaft 56 is rotatably supported at a lower front end of the collection box 22. The latch shaft has opposite ends to which engagement links 57 are attached.

Each of the engagement links 57 turns about the latch shaft 56 to engage with or disengage from a hook 58 provided at a lower rear end of the discharge duct 21. One of the engagement links 57 is connected to one of the vertices of the triangular arms 45 located above the engagement link 57 via a connection bar 59 which is generally in the form of a rod.

With the above-described arrangement, when the posture change lever 12 is pivoted upward through a small angle θ1 (see FIG. 6), the first transmission arm 48 turns about the horizontal shaft portion 12a clockwise in FIG. 6. As a result, the connection rod 46 connected to the first transmission arm 48 turns the triangular arm 45 counterclockwise in FIG. 6. The triangular arm 45 pulls up the connection bar 59, whereby the two opposite engagement links 57 are disengaged from the hooks 58 of the discharge duct 21.

In this state, when the grass collection box 22 is empty, i.e., does not contain turf grass or is substantially empty, i.e., contains a little turf grass, the center of gravity of the grass collection box 22 is located directly below the lateral support shaft 43 which is the rotation center of the grass collection box 22, as indicated by the reference sign G in FIG. 4.

Figure 7:
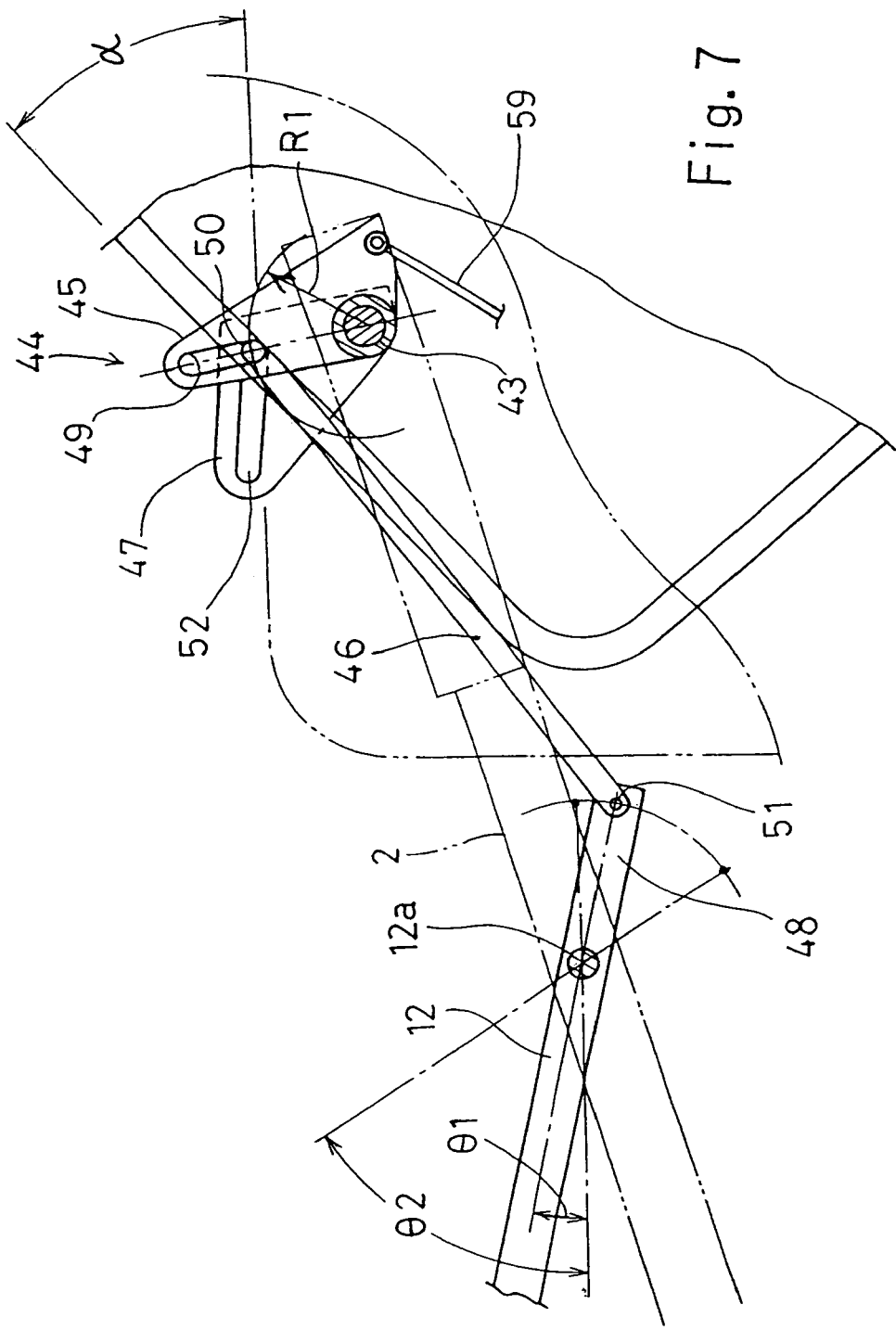
FIG. 7 is a first view showing the turning for posture change of the grass collection box in the empty or substantially empty state.

Therefore, due to the biasing force of the two opposite compression springs 53, the grass collection box 22 automatically turns through a predetermined angle α (see FIG. 7) to have the obliquely downward, discharge posture (see single-dashed lines in FIG. 1) so that the introduction port 22a is oriented obliquely downward.

When the grass collection box 22 is shifted to the obliquely downward, discharge posture, the connection pin 50, which is the point of application of force at one end of the connection rod 46 (the point to which the operational force of the posture change lever 12 is applied to the arm link 47) moves along the elongated groove 52 of the arm link 47 toward the lateral support shaft 43.

As a result, the rotation radius from the lateral support shaft 43 as the rotation center of the grass collection box 22 to the connection pin 50 as the point of application of force is reduced to R1. Therefore, the angle of turning of the arm link 47 per unit quantity of operation of the posture change lever 12, and hence, the angle of turning of the grass collection box 22 per unit quantity of operation increases.

Therefore, when the grass collection box 22 is empty or substantially empty, the posture change lever 12 is turned further upward, with the angle of turning of the arm link 47 per unit quantity of operation of the posture change lever 12 increased. By this operation, the grass collection box 22 is shifted to the downward, complete discharge posture (see double-dashed lines in FIGS. 8 and 1).

On the other hand, when the grass collection box 22 contains much turf grass, the center of gravity of the grass collection box 22 is located at the back of the lateral support shaft 43 as indicated by the reference sign G' in FIG. 4.

Therefore, even when the posture change lever 12 is turned upward only through the small operational angle θ1 (see FIG. 9), the grass collection box 22 keeps the forward, grass collection posture (see solid lines in FIG. 1) due to its weight containing turf grass against the two compression springs 53.

Figure 9:
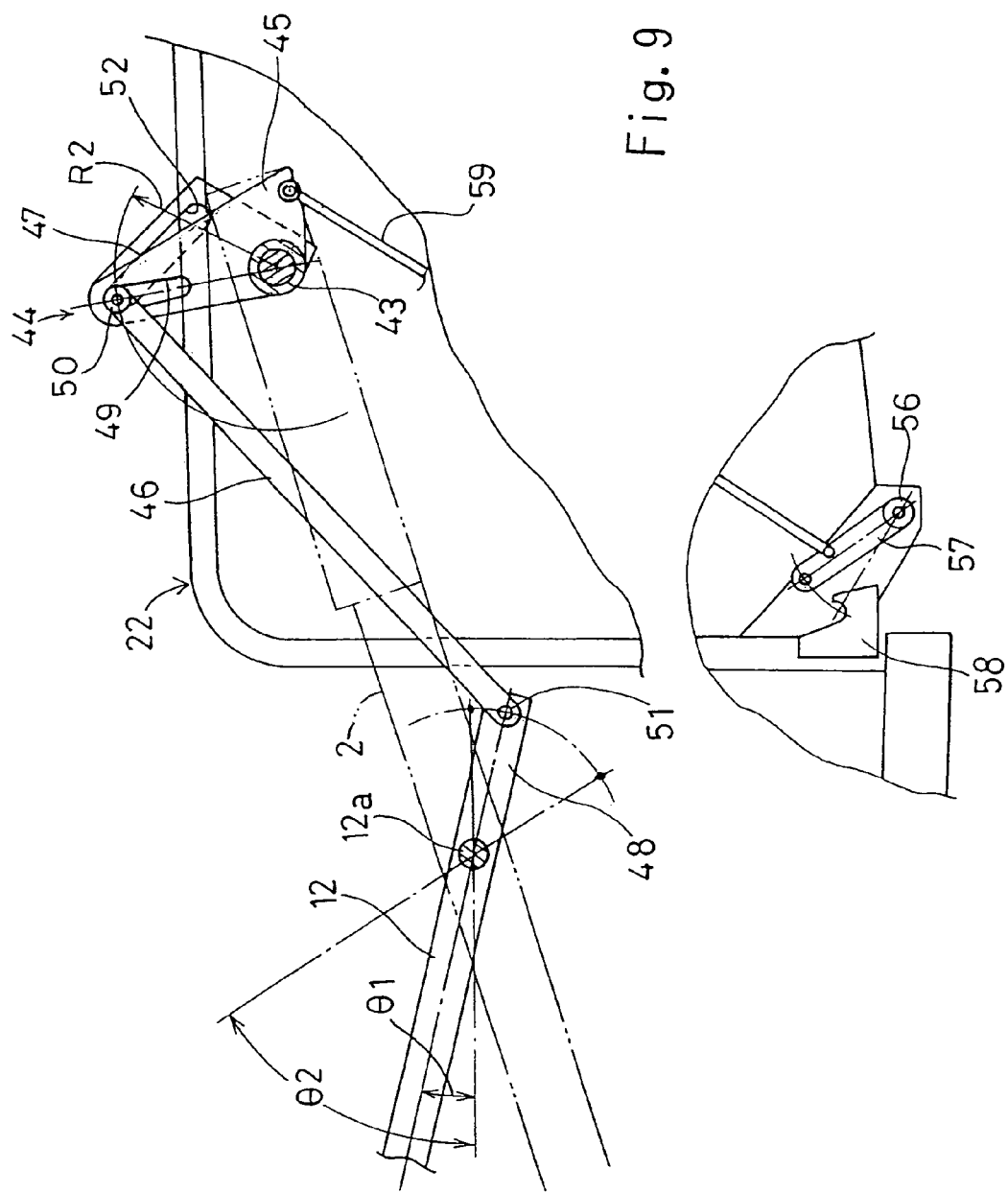
FIG. 9 is a first view showing the turning for posture change of the grass collection box in the state of containing much turf grass.

As shown in FIG. 9, by the upward turning of the posture change lever 12, the connection pin 50, which is the point of application of force at one end of the connection rod 46, moves along the elongated groove 52 of the arm link 47 to separate from the lateral support shaft 43. Therefore, the rotation radius from the lateral support shaft 43 to the connection pin 50 increases to R2. As a result, the angle of turning of the arm link 47 per unit quantity of operation of the posture change lever 12, and hence, the angle of turning of the grass collection box 22 per unit quantity of operation decreases.

Figure 10:
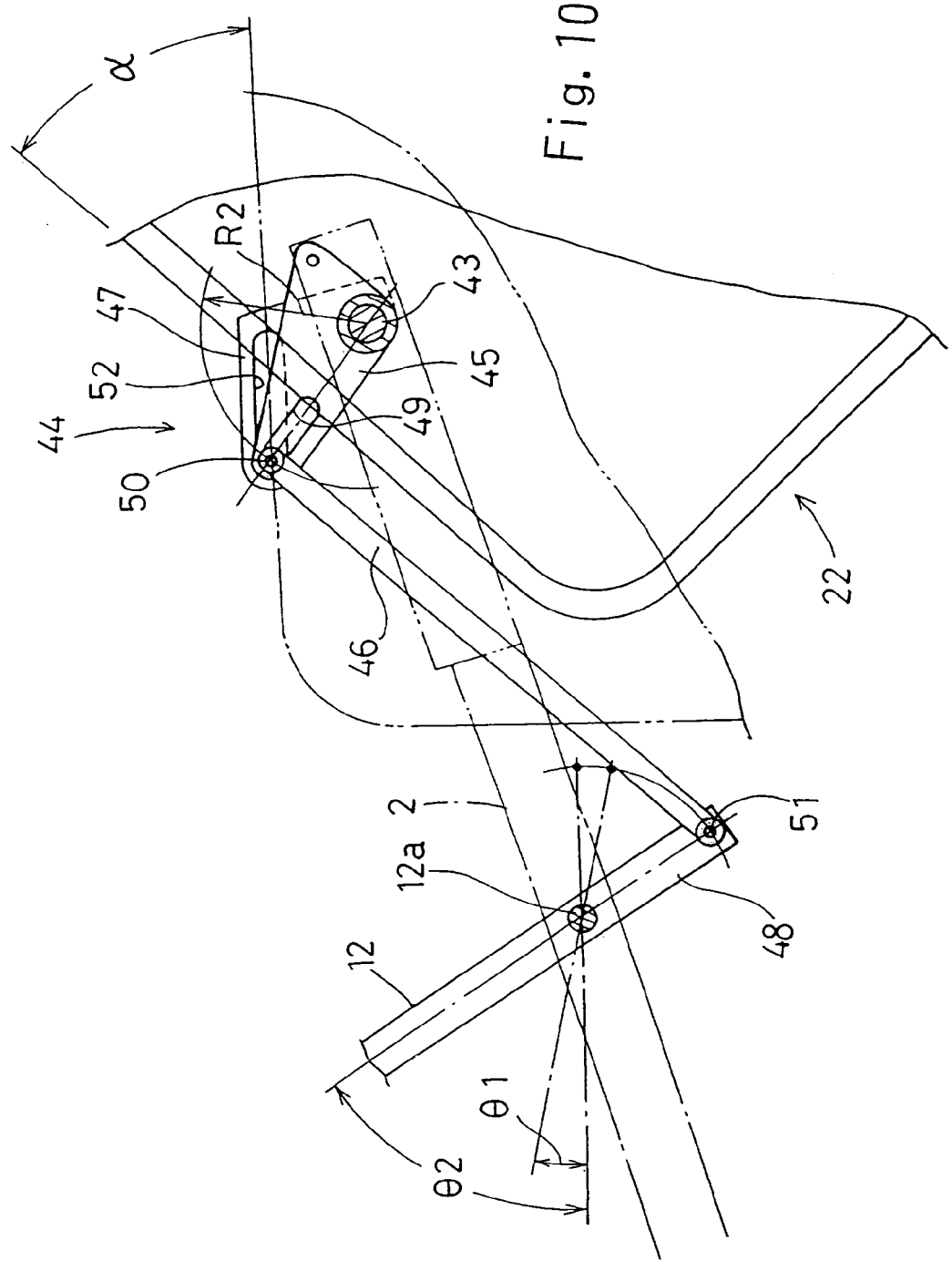
FIG. 10 is a second view showing the turning for posture change of the grass collection box in the state of containing much turf grass.

Therefore, although the grass collection box 22 containing much turf grass is heavy, by turning the posture change lever 12 further upward with a small operational force, the grass collection box 22 turns through a predetermined angle α (see FIG. 10) to shift to the obliquely downward, discharge posture so that the introduction port 22a is oriented obliquely downward. As a result, the turf grass in the grass collection box 22 is discharged onto the ground.

When the discharge of turf grass proceeds to a certain degree, the grass collection box 22 automatically turns to shift to the downward, complete discharge posture by the action of the two fulcrum-crossing tension springs 54.

Figure 8:
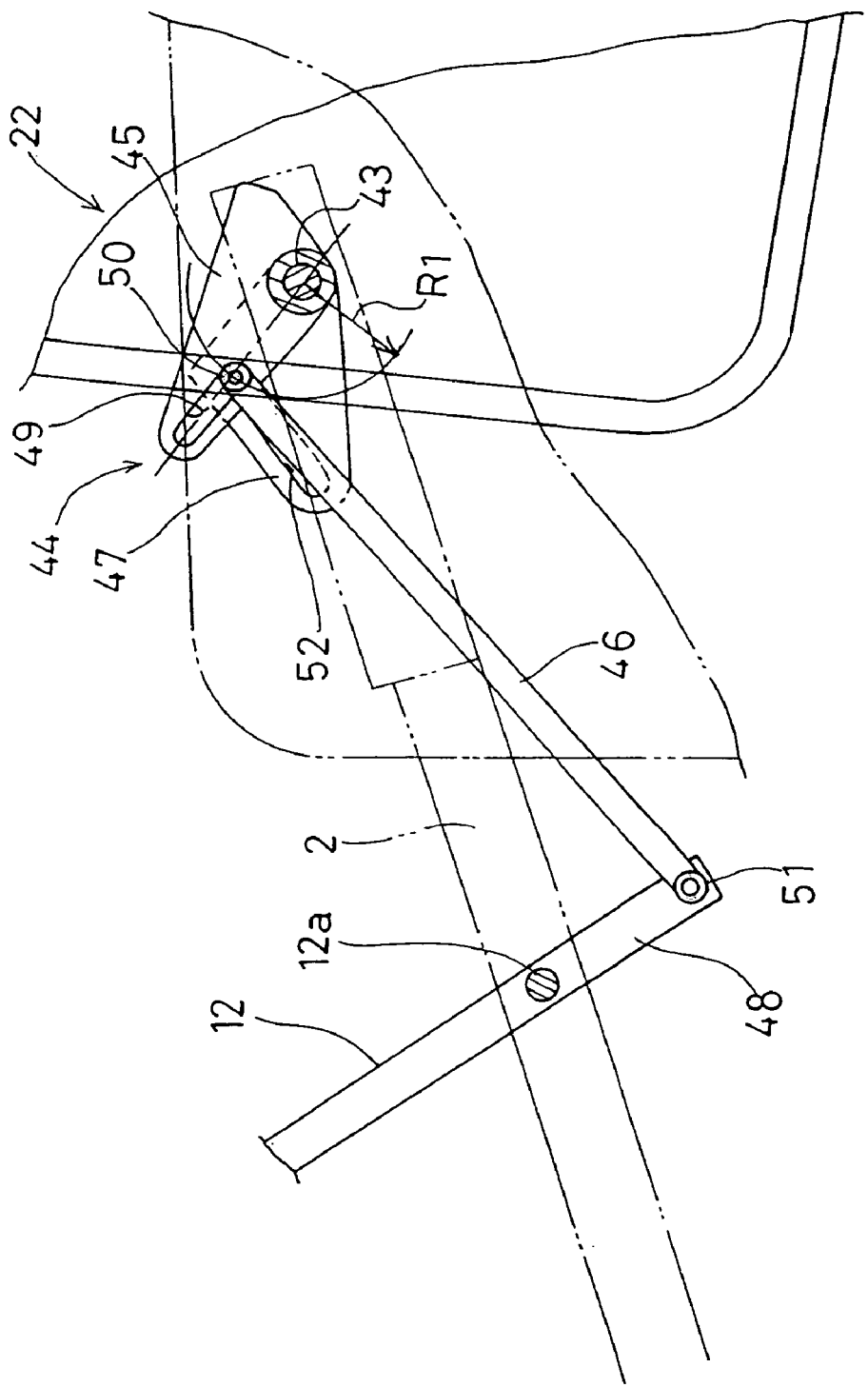
FIG. 8 is a second view showing the turning for posture change of the grass collection box in the empty or substantially empty state.

Thereafter, in the grass collection box 22 which became empty due to the complete discharge of turf grass and is in the downward, complete discharge posture, the connection pin 50, which is the point of application of force at one end of the connection rod 46, moves along the elongated groove 52 of the arm link 47 to come close to the lateral support shaft 43 (see FIG. 8).

Therefore, by turning the posture change lever 12 downward, the grass collection box 22 returns to the forward, grass collection posture (see solid lines in FIG. 1), with the angle of turning of the arm link 47 per unit quantity of operation of the posture change lever 12 increased. Then, the triangular arm 45 turns about the horizontal shaft portion 12a clockwise in FIG. 6 to push down the connection bar 59, so that the two engagement links 57 come into kicking engagement with corresponding hooks 58. As a result, the grass collection box 22 is locked to become unmovable.

In this way, in the traveling mower of this embodiment, the grass collection box 22 can be switched, by turning, between the grass collection posture and the discharge posture by the manual operation of the posture change lever 12. In the switching operation, the angle of turning of the grass collection box 22 per unit quantity of operation of the posture change lever 12 automatically increases when the grass collection box 22 is empty or substantially empty and decreases when the grass collection box 22 contains much turf grass. Therefore, when the grass collection box is empty or substantially empty, the posture change of the grass collection box 22 can be performed with a small operational force corresponding to the light weight of the collection box. Even when the grass collection box 22 contains much turf grass, the posture of the grass collection box 22 can be changed easily and smoothly with a small operational force.

Since the posture change operation of the grass collection box 22 using the posture change lever 12 can be performed with a small operational force corresponding to the presence or absence of turf grass and the amount of turf grass in the grass collection box 22, the burden on the operator can be considerably reduced, and the workability of the traveling mower is enhanced.

The switching mechanism for adjusting the angle of turning of the grass collection box 22 per unit quantity of operation of the posture change lever 12 in accordance with the presence or absence of turf grass and the amount of turf grass in the grass collection box 22 is provided by connecting, for interlocking operation, the posture change lever 12 to the triangular arm 45 and the arm link 47 via the connection rod 46 and so on using the connection pin 50. Therefore, the structure is extremely easy, and the size and the weight can be reduced.

Figure 11:
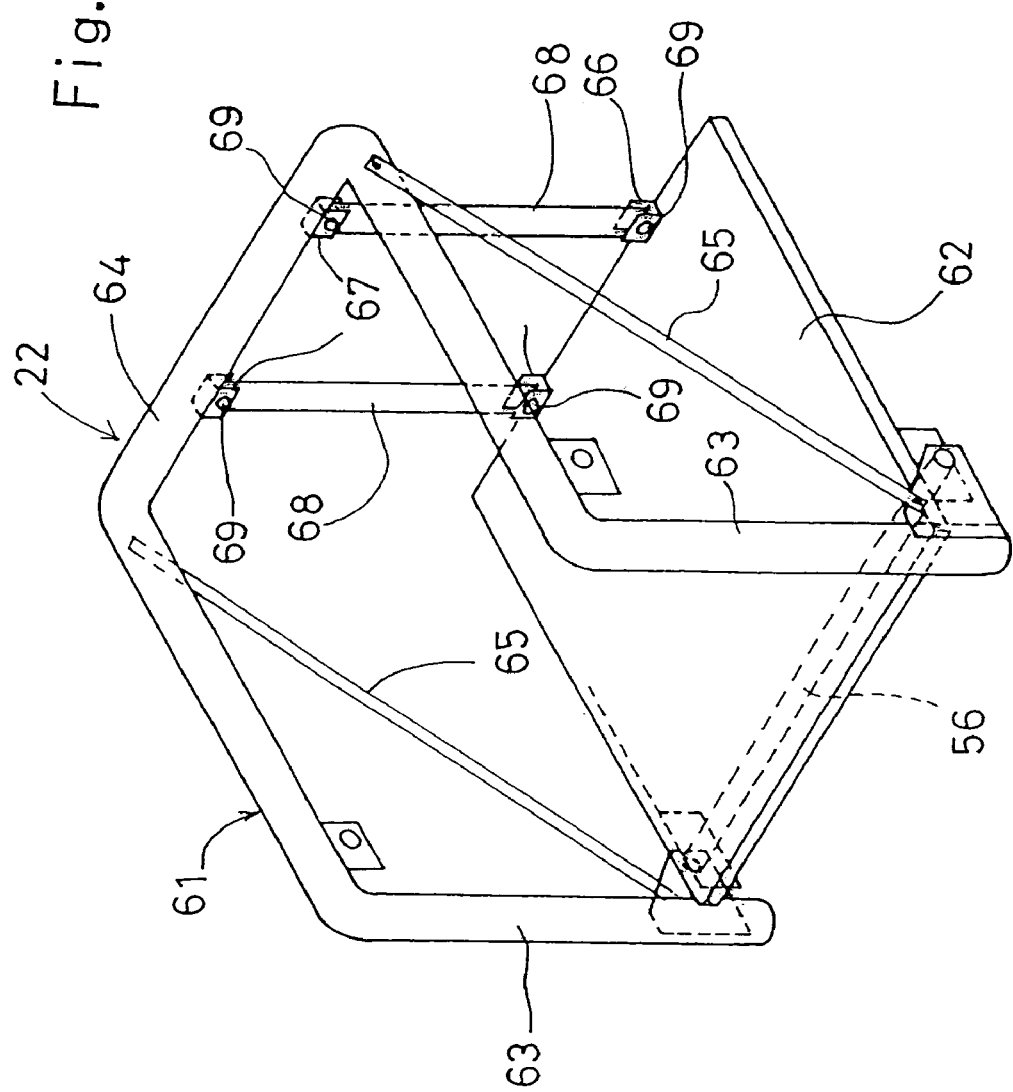
FIG. 11 is a schematic perspective view showing a support frame and a support plate of the grass collection box.

Referring mainly to FIG. 11, the structure of the grass collection box 22 will be described in detail.

The support frame 61 providing the framework of the grass collection box 22 is made up of the paired support posts 63 arranged in parallel with each other, a generally channel-shaped beam 64 connecting respective upper ends of the support posts 63 to each other, and diagonal braces 65 each connecting the front end of each post 63 and the corresponding corner of the beam 64.

In the state in which the support frame 61 and a support plate 62, which defines the bottom surface of the grass collection box 22, are covered by the bag 41, the space between the paired support posts 63 constitutes the introduction port 22a (see FIGS. 1 and 4).

The front end of the support plate 62, i.e., the end on the introduction port 22a side is supported to be pivotable up and down by a latch shaft 56 rotatably held at the lower front end of the grass collection box 22 (front ends of the support posts 63).

First brackets 66 (two brackets in this embodiment) each having a channel-shaped cross section are fixed to the rear portion of the upper surface of the support plate 62. Two second brackets 67 each having a channel-shaped cross section are fixed to the lower surface side of the beam 64 so as to face the first brackets 66, respectively. A leaf spring 68 as a spring having elasticity is fixed, with screws 69, between each of the first brackets 66 and the second bracket 67 facing the first bracket. Therefore, elastic resistance by the leaf springs 68 acts against the pivotal movement of the support plate 62 about the latch shaft 56. The leaf springs 68 correspond to the buffer 68 described in claims 3 and 4. The number of the leaf springs 68 is not limited to two, and it is only necessary that at least one leaf spring is provided.

In the above-described structure, the leaf springs 68 connecting the rear portion of the upper surface of the support plate 62 and the beam 64 to each other allows the support plate 62 to pivot about the latch shaft 56. Therefore, even when the support plate 62 strikes against a curb or the ground during the mowing operation or traveling, the support plate 62 can escape by pivoting upward correspondingly to the direction of the impact force and against the elasticity of the leaf springs 68 (see FIG. 4).

Therefore, the acting of the impact force on the support plate 62 can be alleviated or prevented. Therefore, the possibility of deformation or breakage of the support plate 62 or the support frame 61 can be considerably reduced to enhance the durability of the grass collection box 22, while the bottom surface of the grass collection box 22 is reliably supported by the existence of the support plate 62 even when much turf grass is contained in the grass collection box.

In discharging the grass turf from the grass collection box 22, with the grass collection box 22 held in the complete discharge posture (see double-dashed lines in FIG. 1), the support plate 62 may be pushed or pulled by the operator for pivotal movement so that the turf grass sandwiched between the support plate 62 and the bag 41 or adhering to the support plate 62 can be smoothly discharged onto the ground.

In this embodiment, the leaf springs 68 are used as the buffer. Therefore, the structure is simple, is unlikely break down and requires only a small number of parts, which leads to a decrease in the manufacturing cost. Moreover, by replacing the two leaf springs 68 with those having a different length, the capacity of the grass collection box 22 can be easily changed.

However, the buffer in claim 3 is not limited to the leaf spring 68, and other various parts may be employed such as a coil spring as a spring member, gas spring, rubber (elastic member) or hydraulic damper.

Other parts of the traveling mower of this embodiment will be described below.

First, referring to FIGS. 1, 4, 12 and 13, the structure of the lid cover 42 will be described in detail.

Figure 12:
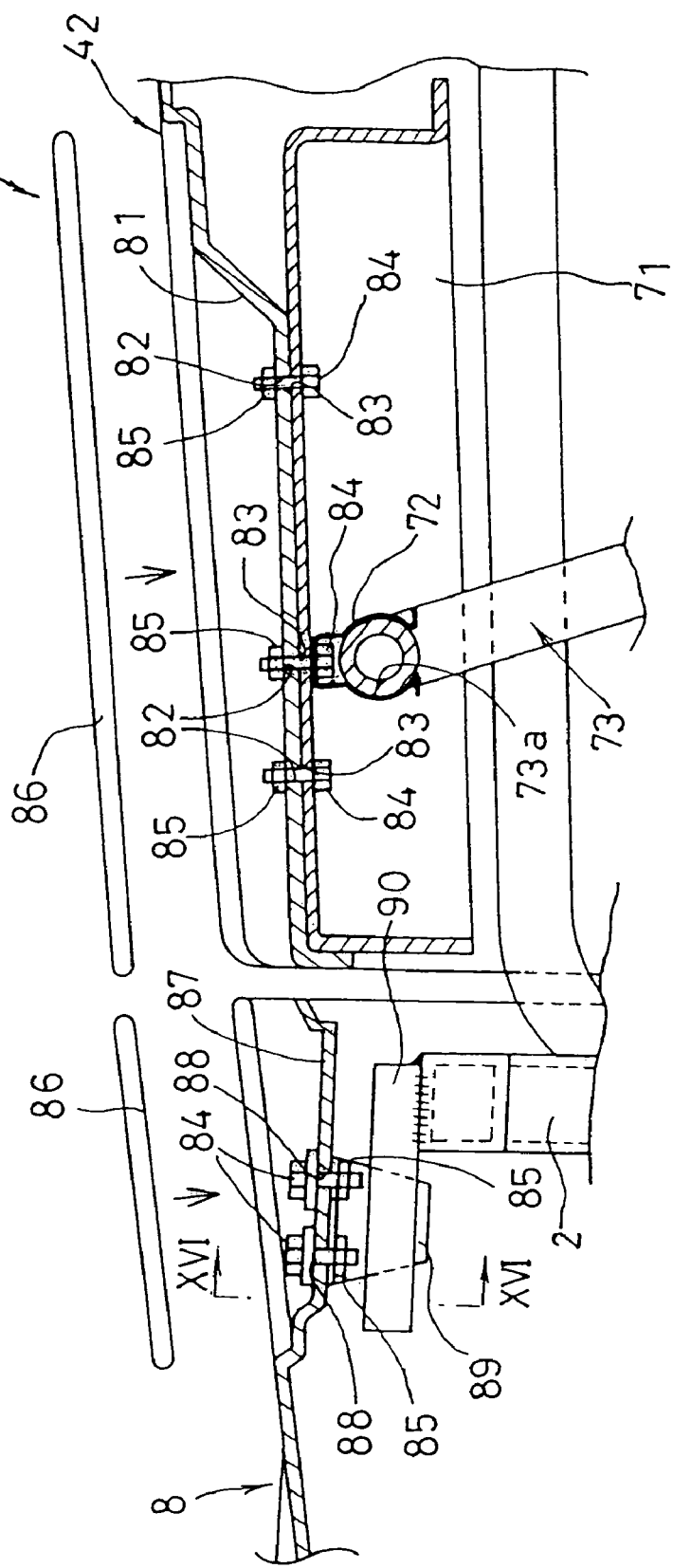
FIG. 12 is a side sectional view showing the portion where the front portion of a lid cover is mounted.
Figure 13:
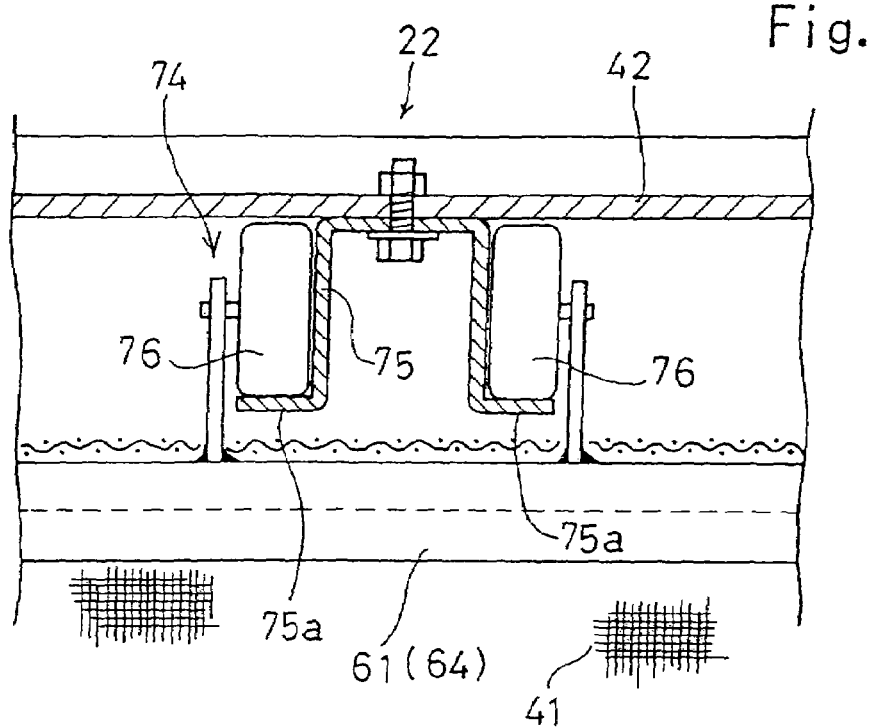
FIG. 13 is a sectional view taken along lines XIII-XIII in FIG. 2.

As shown in FIG. 12, an inner cover 71 is fastened by using a bolt to an inner surface of a front portion of the lid cover 42. To the inner cover, the base end of an elastic clip 72, which comprises e.g. a leaf spring and is Ω-shaped in cross section, is fastened by using a bolt. When the lid cover 42 is put from above on the grass collection box 22, the elastic clip 72 is fitted rotatably and removably to a horizontal shaft portion 73a of a gate-shaped frame 73 standing upward from the rear end of the body frame 2.

The horizontal shaft portion 73a of the gate-shaped frame 73 is positioned above the lateral support shaft 43 and adjacent to the top of the rear edge of the rear cowl 8.

A generally center portion of the inner surface of the rear portion of the lid cover 42 is supported by the upper rear edge of the support frame 61 so as to be slidably movable back and forth in accordance with the posture changing movement of the grass collection box 22 (see FIG. 4).

Specifically, the rear end of the lid cover 42 is supported by the support frame 61 via guide support means 74. The guide support means includes a generally gutter-shaped guide rail 75 which is elongated in the back and forth direction, opens downward, and fastened to the generally center portion of the inner surface of the rear edge of the lid cover 42 with a bolt, and a pair of rollers 76 projecting upward from the rear edge of the support frame 61 (portion of the beam 64) (see FIGS. 4 and 13).

The rollers 76 are so arranged as to sandwich the guide rail 75 from opposite sides. Each of the rollers is fitted between an engagement plate portion 75a extending outward from each side of the guide rail 75 and the inner surface of the rear portion of the lid cover 42. Thus, the rear end of the lid cover 42 is supported by the rollers 76 each of which rotates between the engagement plate portion 75a of the guide rail 75 and the inner surface of the lid cover 42. To the frond end of the guide rail 75, a guide plate 77 projecting triangularly forward like a bow is attached (see FIG. 4).

With this structure, when the posture change lever 12 is turned upward to turn the grass collection box 22 upward about the lateral support shaft 43 for shifting to the obliquely downward discharge posture, the two rollers 76 on the support frame 61 push up the rear end of the lid cover 42 while sliding forward relative to the lid cover between the engagement plate portions 75a and the inner surface of the lid cover 42. As a result, the lid cover 42 turns upward about the horizontal shaft portion 73a of the gate-shaped frame 73 while moving back relative to the grass collection box 22 (see single-dashed lines in FIG. 1).

When the grass collection box 22 is further turned upward for shifting to the downward, complete discharge posture, the lid cover 42 is further pushed up by the rollers 76 on the support frame 61 and turns upward until it stands generally upright while further moving back relative to the grass collection box 22 (see double-dashed lines in FIG. 1).

When the posture change lever 12 is thereafter turned downward to turn the grass collection box 22 downward about the lateral support shaft 43 for shifting to the forward grass collection posture, the two rollers 76 on the support frame 61 pull down the rear end of the lid cover 42 while sliding back relative to the lid cover between the engagement plate portions 75a of the guide rail 75 and the inner surface of the lid cover 42. As a result, the lid cover 42 turns downward to the horizontal state while moving forward relative to the grass collection box 22 (see solid lines in FIG. 1).

In the above-described structure, the rear end of the lid cover 42 is supported from below by the paired rollers 76 which are slidable (reciprocal movement) relative to the lid cover along the guide rail 75. Therefore, although the position of the rotation center of the grass collection box 22 differs from that of the lid cover 42, the lid cover 42 can smoothly turn up and down so as to increase the downward inclination as the grass collection box 22 turns to shift to the discharge posture and decrease the downward inclination as the grass collection box turns to shift to the grass collection posture.

Further, since the position of the rotation center of the grass collection box 22 differs from that of the lid cover 42, the rotation center of the lid cover 42, i.e., the position of the horizontal shaft portion 73*a* of the gate-shaped frame 73 can be set as close to the top of the rear edge of the rear cowl 8 as possible.

Therefore, the gap, which is defined between the lid cover 42 and the rear cowl 8 when the grass collection box 22 is in the grass collection posture, can be made small while preventing the front end of the lid cover 42 from coming into contact with the rear end of the rear cowl 8 when the grass collection box 22 turns to change its posture. Therefore, the boundary (gap) between the rear cowl 8 and the lid cover 42 can be made inconspicuous, and the appearance is as if the lid cover 42 is continuous with the rear end of the rear cowl 42. Thus, the traveling mower looks entirely integral and has a good appearance.

As noted above, the guide support means 74 is made up of the guide rail 75 on the lid cover 42 and the paired rollers 76 on the support frame 61, and the rollers 76 are fitted between the engagement plate portions 75*a* of the guide rail 75 and the inner surface of the lid cover 42 so as to sandwich the guide rail 75 from opposite sides. With such a structure which is simple, unlikely to break down and requires only a small number of parts, the rear edge of the lid cover 42 can be easily supported from below by the two rollers 76 which are slidable (reciprocal movement) relative to the lid cover along the guide rail 75.

Since the paired rollers 76 sandwich the guide-rail 75 from opposite sides, the lid cover 42 is prevented from rattling from side to side. Moreover, since each of the rollers 76 is fitted between the engagement plate portion 75*a* of the guide rail 75 and the inner surface of the lid cover 42, the lid cover 42 is also prevented from rattling up and down.

Therefore, when the structure of the guide support means 74 of this embodiment is employed, chattering sound is not generated from the lid cover 42 during the traveling of the traveling mower.

To mount the lid cover 42 to the upper surface of the grass collection box 22, the guide rail 75 is inserted from its front side (the guide plate 77 side) between the paired rollers 76, and then the lid cover 42 is moved forward so that each of the rollers 55 is fitted between the engagement plate portion 75*a* of the guide rail 75 and the inner surface of the lid cover 42 (see double-dashed lines in FIG. 4).

The guide plate 77 projecting triangularly forward is provided at the front end of the guide rail 75. Therefore, in inserting the guide rail 75 between the two rollers 76, the rollers 76 can be smoothly guided to the opposite sides of the guide rail 75.

Subsequently, with the two rollers 76 moved to the rear side of the guide rail 75, the lid cover 42 is put to the grass collection box 22 from above so as to turn around the position where the rollers 76 are provided, whereby the elastic clip 72 is fitted to the horizontal shaft portion 73*a* of the gate-shaped frame 73 against the elasticity (see solid lines in FIG. 4 and FIG. 12). The lid cover 42 can be removed by performing these process steps in the reverse order.

In this way, the lid cover 42 can be easily attached and detached without using a tool such as a spanner or a screwdriver, so that the maintenance of the grass collection box 22 is easy.

Figure 14:
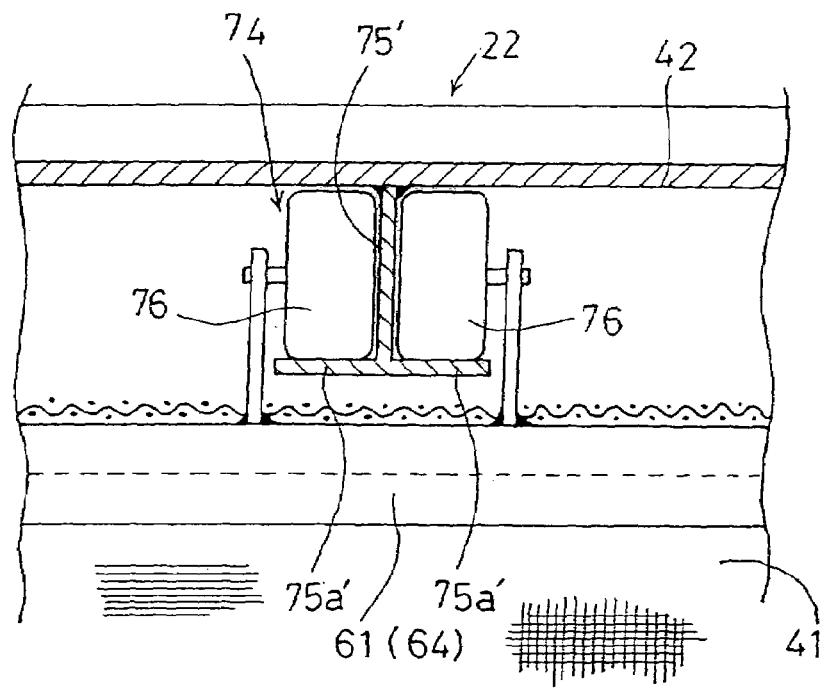
FIG. 14 is a sectional view showing another example of guide support means.
Figure 15:
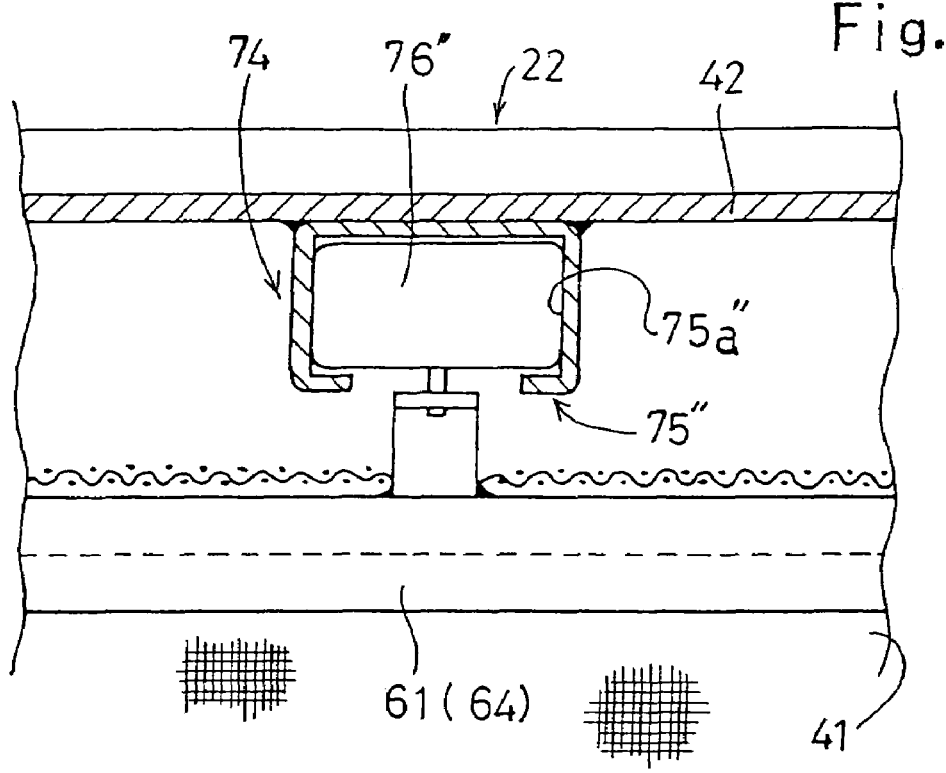
FIG. 15 is a sectional view showing still another example of guide support means.

FIGS. 14 and 15 illustrate another example of guide support means 74.

The structure shown in FIG. 14 differs from that of the foregoing embodiment in that a guide rail 75' which is inverted T-shaped in cross section is fixed, by welding, to the generally center portion of the inner surface of the rear portion of the lid cover 42. Similarly to the foregoing embodiment, rollers 76 are fitted between the engagement plate portions 75*a*' of the guide rail 75 which extend outward from opposite sides of the guide rail 75' and the inner surface of the lid cover 42 so as to sandwich the guide rail 75' from the opposite sides.

The structure shown in FIG. 15 differs from that of the foregoing embodiments in that the guide support means 74 is made up of a generally C-shaped guide rail 75" which opens downward and attached to the inner surface of the rear portion of the lid cover 42, and a single roller 76" projecting upward from an upper rear end of the support frame 61. The roller 76" is fitted in a downward guide groove portion 75*a*" of the guide rail 75" so as to rotate on opposite inner side surfaces of the guide rail 75".

As will be understood from these examples, the shape of the guide rail can be modified in various ways as long as the roller can reciprocally move along the guide rail without rattling horizontally or vertically. The number of rollers can be set appropriately in accordance with the shape of the guide rail.

The arrangement of the foregoing embodiment may be inverted, i.e., the elastic clip 72 may be fixed to the body frame 2, whereas the gate-shaped frame 73 may be fixed to the front portion of the inner surface of the lid cover 42. Further, the guide rail may be fixed to the support frame 61, whereas the roller may be fixed to the rear portion of the inner surface of the lid cover 42.

As shown in FIG. 12, the front end of the lid cover 42 is formed with a pair of recesses 81 which are arranged symmetrically. In each of the recesses 81, three mounting holes 83 spaced in a back and forth direction are provided. Similarly, the inner cover 71 is formed with two symmetrical sets of bolt-insertion holes 83 each set including three holes (six in total) at locations corresponding to the mounting holes 82 of the lid cover 42. Each of the recesses 81 of the lid cover 42 has a size sufficient for receiving the head of a bolt 84 or a nut 85.

With the inner cover 71 arranged on the front inner surface side of the lid cover 42, the inner cover 71 is removably fixed to the front portion of the inner surface of the lid cover 42 by screwing the bolt 84 from below into the nut 85 placed in each of the mounting holes 82 in the recess 81 via the bolt-insertion hole 83 and the mounting hole 82. The base end of the elastic clip 72 is attached to the middle one of the three bolts 84 for each of the recesses 81, which are spaced in the back and forth direction. A dressing cover 86 made of a synthetic resin is fitted from above to each of the recesses 81.

Figure 16:
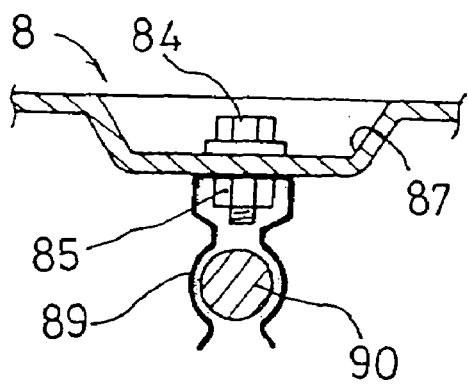
FIG. 16 is a sectional view taken along lines XVI-XVI in FIG. 12.

As shown in FIGS. 12 and 16, a pair of recesses 87 is formed at the rear end of the rear cowl 8. In each of the recesses, two through-holes 88 are formed to be spaced from each other in the back and forth direction. By using bolts 84 and nuts 85, a spring clip 89 made of a leaf spring, for example, is fixed to a rear portion of the inner surface of the rear cowl 8 at locations where the through-holes 88 are provided. By putting the rear cowl 8 onto the body frame 2 from above, the spring clip 89 is removably fitted to an engagement piece 90 which is in the form of a round shaft or a pipe and mounted to the rear portion of the body frame 2.

Each of the recesses 87 of the rear cowl 8 has a size sufficient for receiving the head of the bolt 84 or the nut 85 and is formed at the rear end of the rear cowl 8 at a location corresponding to the recess 81 of the lid cover 42. Therefore, when the grass collection box 22 is in the grass collection posture, each of the recesses 81 aligns with the corresponding one of the recesses 87 (see FIG. 2). A dressing cover 86 made of a synthetic resin is also fitted from above to each of the recesses 87.

With this structure, the dressing cover 86 covers the nut 85 or the head of the bolt 84 so that the appearance of the lid cover 42 and hence the appearance of the entire traveling mower is enhanced. Further, when the grass collection box 22 is in the grass collection posture, the recesses 81 and the recesses 87 align with each other so that the face covers 86 covering the recesses form a symmetrical parallel pattern, which further enhances the appearance of the entire traveling mower.

Next, referring mainly to FIGS. 17 and 18, the structure of the driver's seat 10 will be described.

Figure 17:
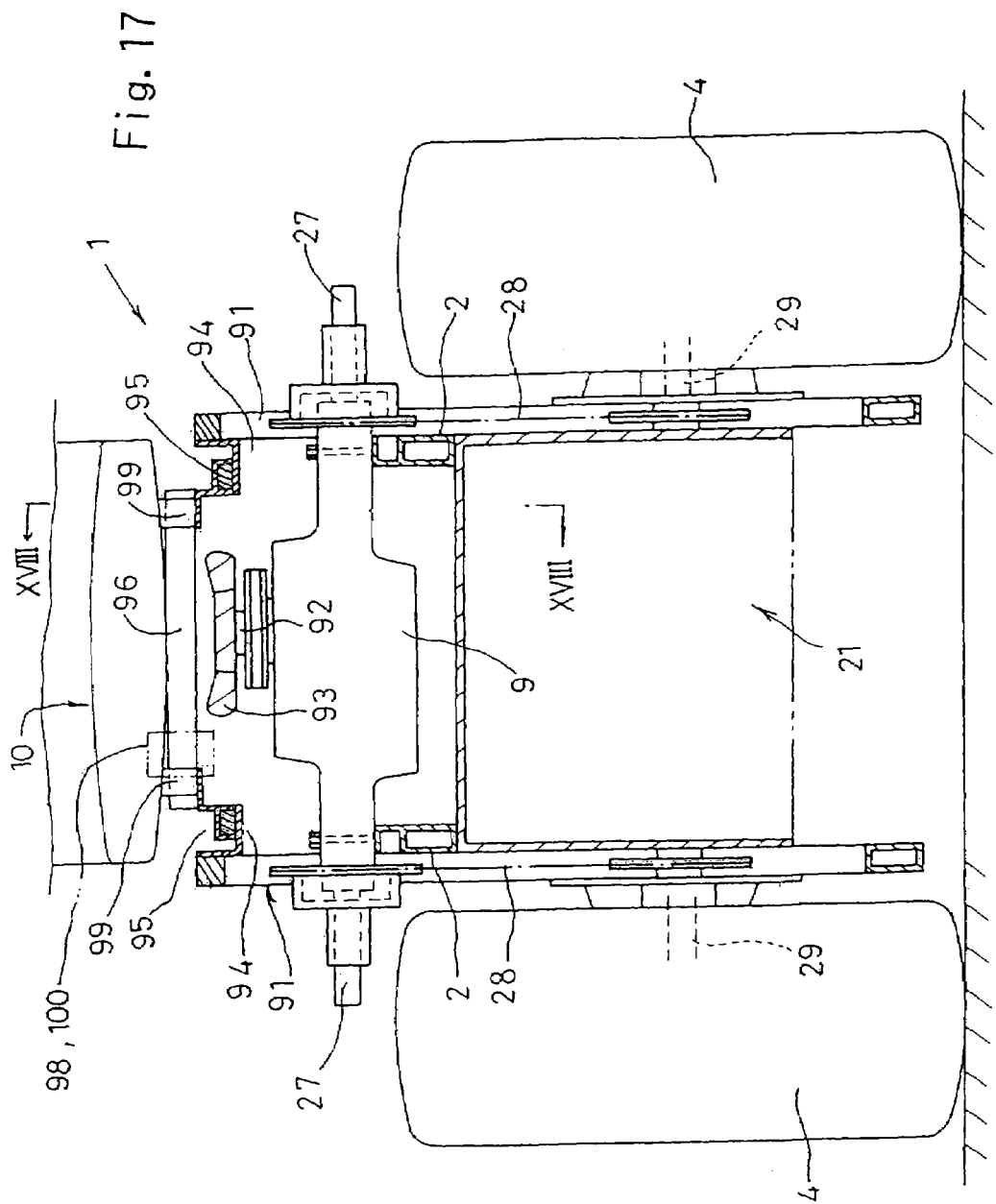
FIG. 17 is a sectional view taken along lines XVII-XVII in FIG. 1.

As shown in FIG. 17, a pair of bracket members 91, each gate-shaped in side view, are symmetrically mounted to the outer side surfaces of a rear portion of the body frame 2. Between the two bracket members, the transmission case 9 is mounted 91 above the body frame 2, whereas the discharge duct 21 is arranged below the body frame 2.

An input shaft 92 projects upward from the transmission case 9. An impeller 93 is mounted to the upper end of the input shaft. By rotating the impeller 93 together with the input shaft 92, air around the driver's seat 10 is sucked, whereby downward airflow toward the transmission case 9 is generated. The airflow functions to dissipate the heat generated at the transmission case 9.

A receiving member 94 having an L-shaped cross section is removably mounted to the inner surface of an upper portion of each of the bracket members 91. To the upper surface of each receiving member 94, a rail 95 extending in the back and forth direction is mounted. The rails 95 support a seat bracket 96 mounted to the lower surface of the driver's seat 10 so that the seat bracket is movable in the back and forth direction. Therefore, the driver's seat 10 is movable in the back and forth direction to adjust its position.

Figure 18:
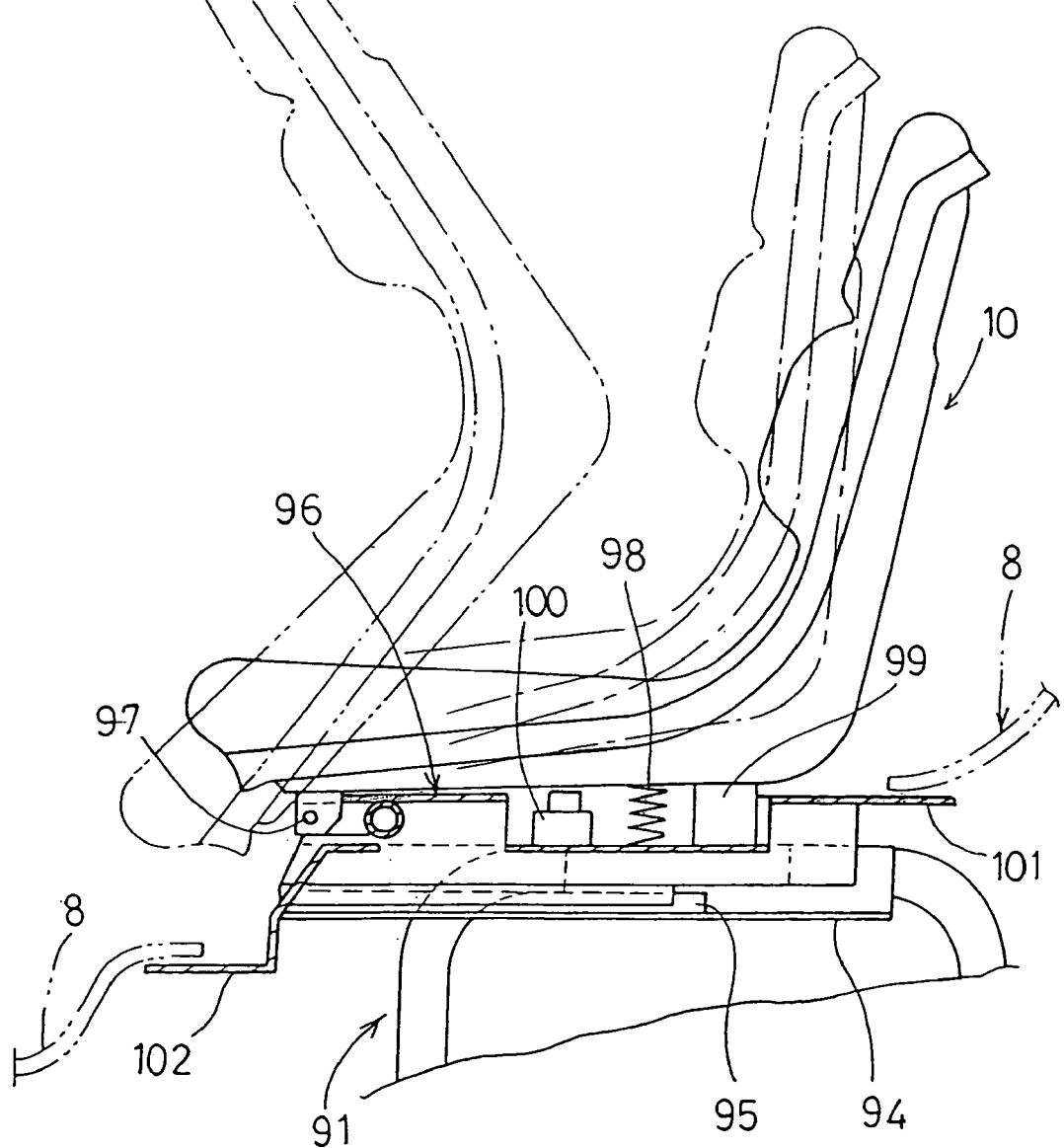
FIG. 18 is an enlarged sectional view taken along lines XVIII-XVIII in FIG. 17.

As shown in FIG. 18, the front end of the seat bracket 96 is pivotally fixed to the front end of the driver's seat 10 with a pivot pin 97. Therefore, the driver's seat 10 is not only movable in the back and forth direction but also pivotable about the pivot pin 97 to plunge forward (see double-dashed lines in FIG. 18).

The seat bracket 96 is provided with spring means 98 which biases the driver's seat 10 to pivot and raise up the seat slightly (see single-dashed lines in FIG. 18) when an operator is not seated on the seat. The seat bracket is further provided with cushions 99 with which the lower surface of the driver's seat 10 comes into contact when an operator is seated on the seat.

The seat bracket 96 is further provided with a limit switch 100 for detecting contact with the lower surface of the driver's seat 10.

When the operator sits on the driver's seat 10, the driver's seat 10 pivots downward against the biasing force of the spring means 98 to come into contact with the limit switch 100. As a result, the limit switch 100 is turned on to start the engine 5 or make the power transmission from the engine 5 to the rear wheels 4 and the mower unit 15 possible.

When the operator leaves the driver's seat 10, the rear portion of the driver's seat rises up from the seat bracket 96 so as to plunge forward due to the biasing force of the spring means 98, so that the lower surface of the driver's seat 10 separates from the limit switch 100. As a result, the limit switch 100 is turned off, whereby the engine 5 is stopped or the power transmission from the engine 5 to the rear wheels 4 and the mower unit 15 is interrupted.

In this embodiment, the spring means 98, one of the cushions 99, and the limit switch 100 are aligned in the back and forth direction on the seat bracket 96. The cushions 99 are arranged symmetrically in plan view at a rear portion of the seat bracket 96. As viewed in plan, the spring means 98 and the limit switch 100 are aligned on one side of the driver's seat 10 so that the limit switch 100 is closer to the pivot pin 97 of the driver's seat 10 than the spring means is.

With this structure, since the spring means 98, the cushions 99 and the limit switch 100 are aligned horizontally, the arrangement height of these members 98-100 can be set relatively small, while making the driver's seat 10 movable in the back and forth direction of the traveling mower 1 for position adjustment.

Further, since the spring 98 and the limit switch 100 are aligned on one side of the driver's seat 10 while the cushions 99 are arranged symmetrically at the rear portion of the seat bracket 96, a large space can be secured under the driver's seat 10. Therefore, the space under the driver's seat 10 can be effectively utilized for arranging other parts such as the impeller 93, for example.

Moreover, by arranging the limit switch 100 on the front side (the pivot pin 28 side) of the driver's seat 10 while arranging the cushions 99 and the spring means 98 at the rear portion of the seat bracket 96, the detection sensitivity of the limit switch 100 in sensing the rising of the driver's seat 10 can be set relatively low. Therefore, even when the driver's seat 10 rises slightly due to e.g. vibrations during the mowing or traveling, the traveling mower is prevented from unintentionally stopping.

As shown in FIG. 18, the rear cowl 8 is formed with an opening at the location of the driver's seat 10 so that the seat bracket 96 on the bracket members 91 and the driver's seat 10 are connected to each other.

A rear cover plate 101 extending rearward generally horizontally is mounted to the rear end of the seat bracket 96. The rear cover plate 101 is inserted under the rear cowl 8 through the opening thereof. A front cover plate 102 extending forward generally horizontally is mounted to the front end of the seat bracket 96. The front cover plate 102 is also inserted under the rear cowl 8 through the opening thereof.

With such a structure, the rear cover plate 101 inserted under the rear cowl 8 moves back and forth together with the driver's seat 10. Therefore, the gap between the rear cowl 8 and the rear portion of the driver's seat 10 can be constantly closed by the rear cover plate 101. Further, the front cover plate 102 inserted under the rear cowl 8 moves back and forth together with the driver's seat 10. Therefore, the gap between the rear cowl 8 and the front portion of the driver's seat 10 can be constantly closed by the front cover plate 102.

Figure 19:
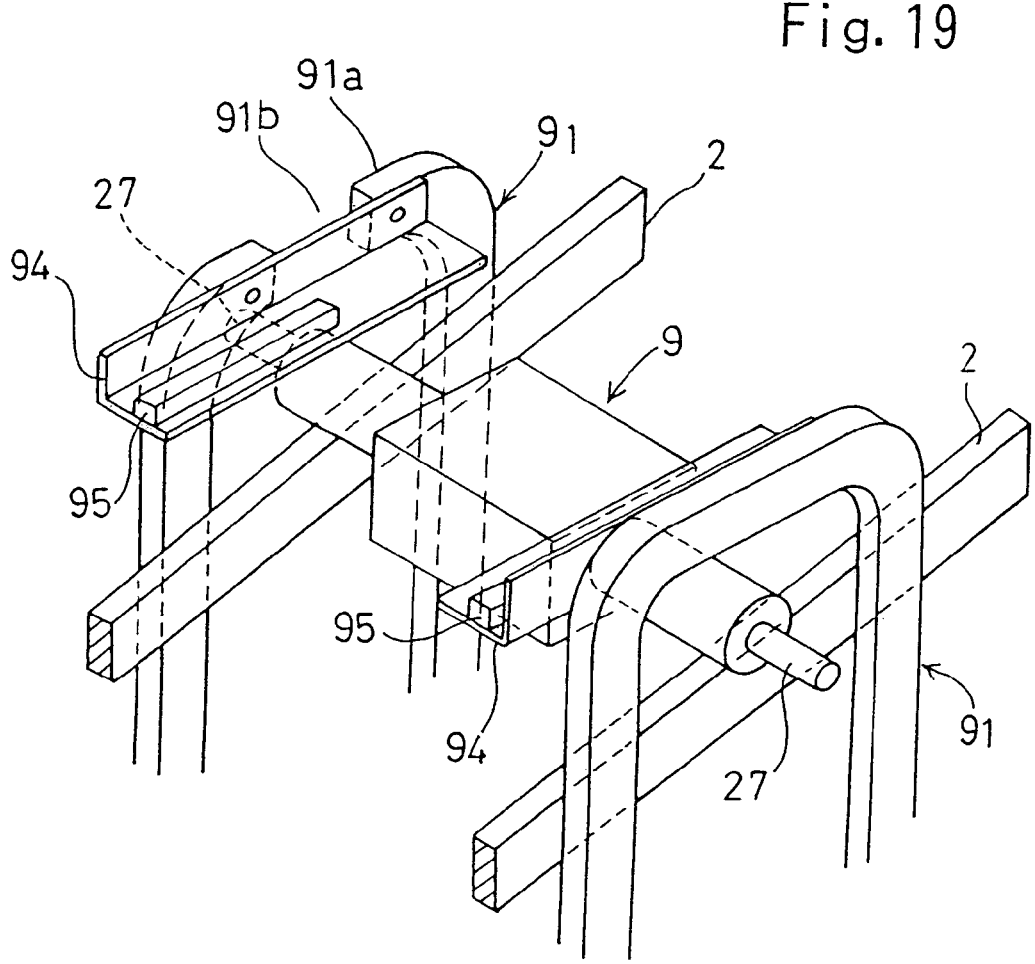
FIG. 19 is a schematic perspective view showing the framework structure around a transmission case.

In this embodiment, the structure shown in FIG. 19 is employed for the purpose of facilitating the manufacture (assembling) of the traveling mower.

Specifically, one of the paired bracket members 91 includes a horizontal portion 91a which is cut at a portion 91b, and the receiving member 94 supporting the driver's seat 10 connects and fixes the cut portion 91b (by using bolts 103).

With such a structure, when the receiving member 94 is detached by loosening the bolts 103, one end of the cross shaft 27 of the transmission case 9 can be caused to pass through the cut portion 91b for placing on the body frame 2. Therefore, even when the cross shaft 27 is longer than the spacing between the two bracket members 91, the transmission case 9 can be easily arranged between the bracket members 91.

As shown in FIG. 3, on the upper surface of the transmission case 9, a power interrupting mechanism 104 is provided which serves to completely interrupt the power transmission from the engine 5 to the two rear wheels 4 and make the rear wheels 4 freely rotatable.

An operation lever 105 extending in the back and forth direction is provided above the discharge duct 21. The front end of the operation lever is connected to the power interrupting mechanism 104. The rear end of the operation lever 21 is provided with a grip portion 105a. The grip portion projects from a portion within the grass collection box 22 which can be reached from the driver's seat 10 (operated from the driver's seat 10) when the grass collection box 22 is in the complete discharge posture (see FIG. 22).

With such a structure, during the mowing or the normal traveling, the grip portion 105a of the operation lever 105 for the power interrupting mechanism 20 is covered by the grass collection box 22, which is in the forward, grass collection posture. Therefore, the operation lever 105 is reliably prevented from unintentionally operated manually during the mowing or the normal traveling.

For instance, to get the rear wheels 4 out of the state stuck in the mud, the position switching lever 12 is turned upward to shift the grass collection box 22 to the complete discharge posture. As a result, the grip portion 105a of the operation lever 105 appears at a position reachable from the driver's seat 10. By manually operating the grip portion 105a, the power transmission from the engine 5 to the two rear wheels 4 is completely interrupted, so that the rear wheels 4 become freely rotatable. In this way, the manual operation of the grip portion 105a becomes possible only when it is necessary.

Next, with reference to FIGS. 1, 4 and 20, the structure of the discharge duct 21 will be described in detail.

The discharge duct 21 includes an upper duct member 111 which is in the form of a downwardly open channel in cross section and fixed to the body frame 2 and to the two bracket members 91, a lower duct member 112 which is in the form of an upwardly open channel in cross section and closing the front half of the downward opening of the upper duct member 111, and a switching valve plate 113 closing the rear half of the downward opening (see FIG. 4).

Figure 20:
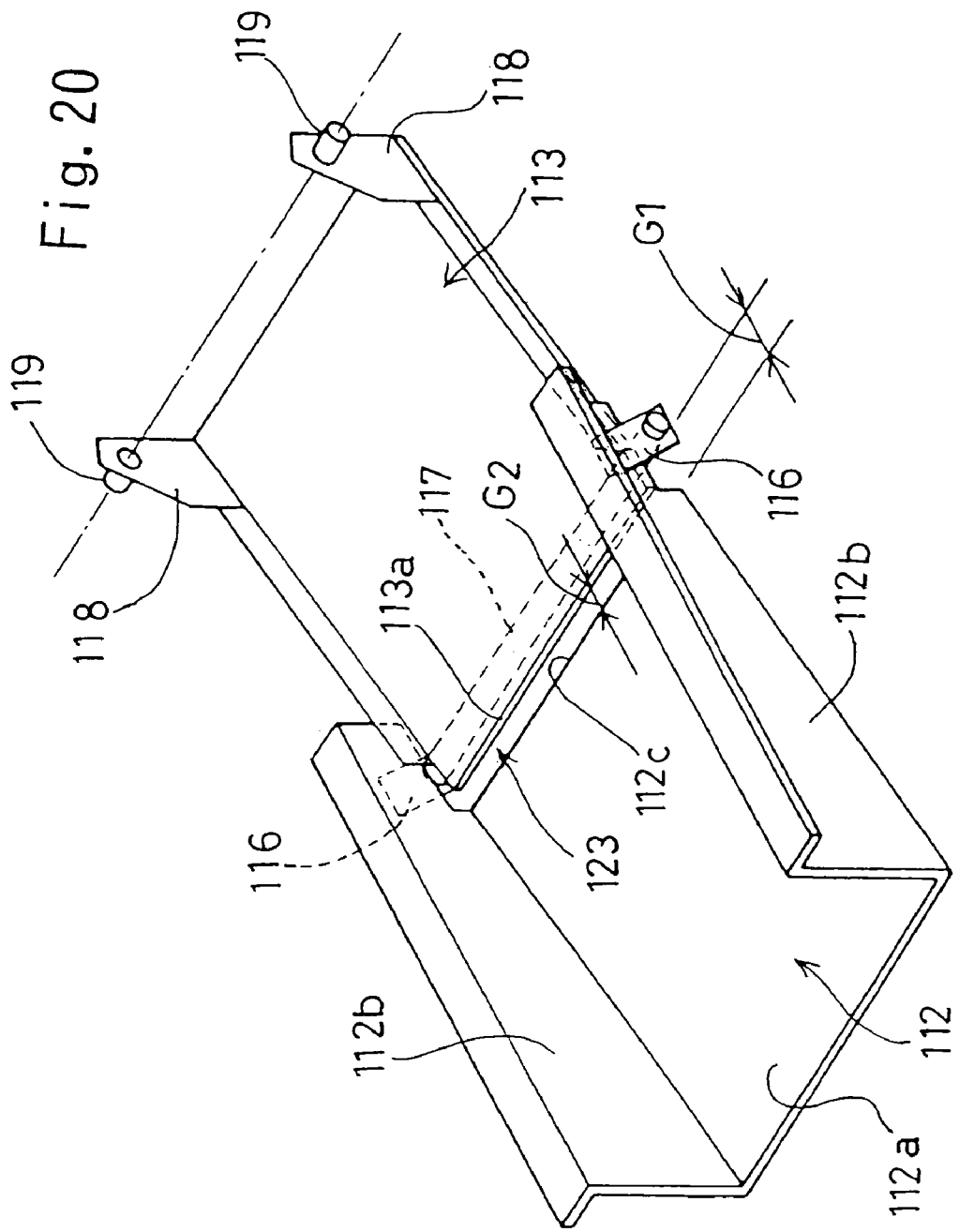
FIG. 20 is a schematic perspective view showing a discharge duct and a switching valve plate.

As shown in FIG. 20, the lower duct member 112 includes a pair of side plates 112b and a bottom plate 112a. One end of each of the side plates projects outward (rearward) from the bottom plate. Each of the projecting ends is pivotally fixed to an intermediate portion of each side plate of the upper duct member 111 by using a pin 114, whereby the lower duct member 112 is connected to the upper duct member 111 so as to be pivotable up and down (see FIG. 4).

The free ends (side ends) of the lower duct member 112 on the mower unit 15 side is connected to the mower unit 18 via a pair of connection bars 115 so that the lower duct member 112 turns pivots up and down in accordance with the up-and-down movement of the mower unit 15 (see FIG. 1).

A downwardly projecting plate 116 is fixed, by e.g. welding, to the projecting end of each side plate 112b of the lower duct member 112. As an example of positioning member, a bar 117 which is thin and circular in cross section is provided to bridge between the two plates 116. Therefore, the bar 117 is positioned below a frame portion 123 surrounded by the rear edge 112c of the bottom plate 112a and the projecting ends of the two side plates 112b, 112b. A predetermined gap G1 is defined between the rear edge 112c of the bottom plate 112a and the bar 117. In this embodiment, the bar 117 is arranged generally in parallel with the longitudinal direction (side to side direction) of the rear edge 112c of the bottom plate 112a. The width, i.e., the dimension in the side to side direction of the lower duct member 112 is larger than the width of the duct portion of the mower unit 15 and smaller than the width of the upper duct member 111.

The switching valve plate 113 is a rectangular thin plate having an area which can be fitted to the rear half of the downward opening of the upper duct member 111 and the discharge port 21a of the discharge duct 21. The switching valve plate 113 has an end to which a pair of upwardly projecting bracket pieces 118 is mounted. A pin shaft 119 projecting outward is attached to each of the bracket pieces 118. By fitting the pin shafts 119 of the switching valve plate 113 into holes (not shown) formed at the rear ends of the side plates of the upper duct member 111, the switching valve plate 113 is also connected to the upper duct member 111 so as to be pivotable up and down (rise and fall).

As shown in FIG. 4, a pivot arm 120 is mounted to each of the pin shafts 119. The pivot arm is connected, via a generally rod-shaped link bar 121, to a second transmission arm 122 projecting from the horizontal shaft portion 12a of the posture change lever 12. (Therefore, two second transmission arms 122 are attached to the horizontal shaft portion 12a of the posture change lever 12.)

When the switching valve plate 113 is turned downward so as to close the rear half of the downward opening of the upper duct member 111, the free end on the mower unit 15 side is received in the frame portion 123 of the lower duct member 112 and supported on the bar 117. Because of the existence of the bar 117, the switching valve plate 113 does not turn downward beyond the close position (see the state indicated by solid lines in FIG. 4).

In this embodiment, the positional relationship between the switching valve plate 113 and the bar 117 is so set that the inner surface of the bottom plate 112a of the lower duct member 112 and the obverse surface of the switching valve plate 113 become flush with each other (the obverse surface of the switching valve plate 113 is positioned on an extension of the inner surface of the bottom plate 112a) (see FIG. 4). The positional relationship may be so set that the free end 113a of the switching valve plate 113 is positioned lower than an extension of the inner surface of the bottom plate 112a.

When the switching valve plate 113 is at the closed position shown in FIG. 4, a gap G2 is defined between the rear edge 112c of the lower duct member 112 and the free end 113a of the switching valve plate 113. The gap G2 is set so as not to allow turf grass to drop to the outside during the mowing operation (approximately 5 to 30 mm in this embodiment). The gap G1 between the rear edge 112c of the lower duct member 112 and the bar 117 is not smaller than the gap G2.

With such an arrangement, when the posture change lever 12 is turned upward to turn the grass collection box 22 upward about the lateral support shaft 43 for shifting to the downward, complete discharge posture, the paired second transmission arms 112 also turn about the horizontal shaft portion 12a of the posture change lever 12. Therefore, the link bar 111 connected to the second transmission arm 112 turns the relevant pivot arm 120 and the pin shaft 119 integrally upward.

As a result, the switching valve plate 113 jumps up to turn about the pin shaft 119, so that the rear half of the downward opening of the upper duct member 111 is opened.

Thereafter, when the posture change lever 12 is turned downward to turn the grass collection box 22 downward about the lateral support shaft 43 for shifting to the forward, grass collection posture, the second transmission arms 112 also turn downward about the horizontal shaft portion 12a. Therefore, the link bar 111 connected to the second transmission arm 112 turns the relevant pivot arm 120 and the pin shaft 119 integrally downward. As a result, the switching valve plate 113 turns downward about the pin shaft 119 so as to close the rear half of the downward opening of the upper duct member 111, and the free end thereof is rested on the bar 117.

In this case, with the gap G2 defined between the free end 113a of the switching valve plate 113 and the rear edge 112c of the bottom plate 112 of the lower duct member 112, the switching valve plate 113 in the closed position shown in FIG. 4 is supported by the thin bar 117 positioned below the frame portion 123 of the lower duct member 112. Therefore, in the state in which the switching valve plate 113 is brought into engagement with the bar 117, i.e., in the closed position shown in FIG. 4, the free end 113a of the switching valve plate 113 does not form a stepped portion in the discharge duct 21.

Therefore, the possibility that turf grass is caught on the free end 113a of the switching valve plate 113 is considerably reduced. Further, in this embodiment, the inner surface of the bottom plate 112a of the lower duct member 112 and the obverse surface of the switching valve plate 113 are made flush with each other, so that the transfer of turf grass into the grass collection box 22 can be performed smoothly.

Even when the switching valve plate 113 is turned so as to jump up with turf grass accumulated across the rear edge 112c of the bottom plate 112a and the free end 113a of the switching valve plate 113, the gap G1, which is larger than the gap G2 between the rear edge 112c of the bottom plate 112a and the free end 113a of the switching valve plate 113, is defined between the rear edge 112c and the bar 117, and the bar 117 itself is thin. Therefore, the turf grass dropped from the lower duct member 112 or the switching valve plate 113 is unlikely to be caught on the bar 117.

Even when turf grass is caught on the bar 117, the turf grass is unstable on the bar 117 which is thin and circular in cross section. Therefore, the turf grass is easily dropped off to the ground by the switching valve plate 113 turning downward.

Therefore, clogging of the discharge duct 21 due to the accumulation of turf grass is reliably prevented without impairing the deflector function (the function to change the grass turf discharge destination) of the switching valve plate 113. Therefore, the frequency of cleaning of the inside of the discharge duct 21 can be reduced.

Since the gap G2 is defined between the rear edge 112c of the bottom plate 112a of the lower duct member 112 and the free end 113a of the switching valve plate 113, the rear edge 112c of the bottom plate 112a and the free end 113a of the switching valve plate 113 do not come into contact with each other. Therefore, the switching valve plate 113 can turn up and down smoothly. Since the gap G2 is set to a dimension which does not allow turf grass to drop therethrough during the mowing operation, there is little possibility that turf grass is scattered around through the gap between the lower duct member 112 and the switching valve plate 113.

Figure 21:
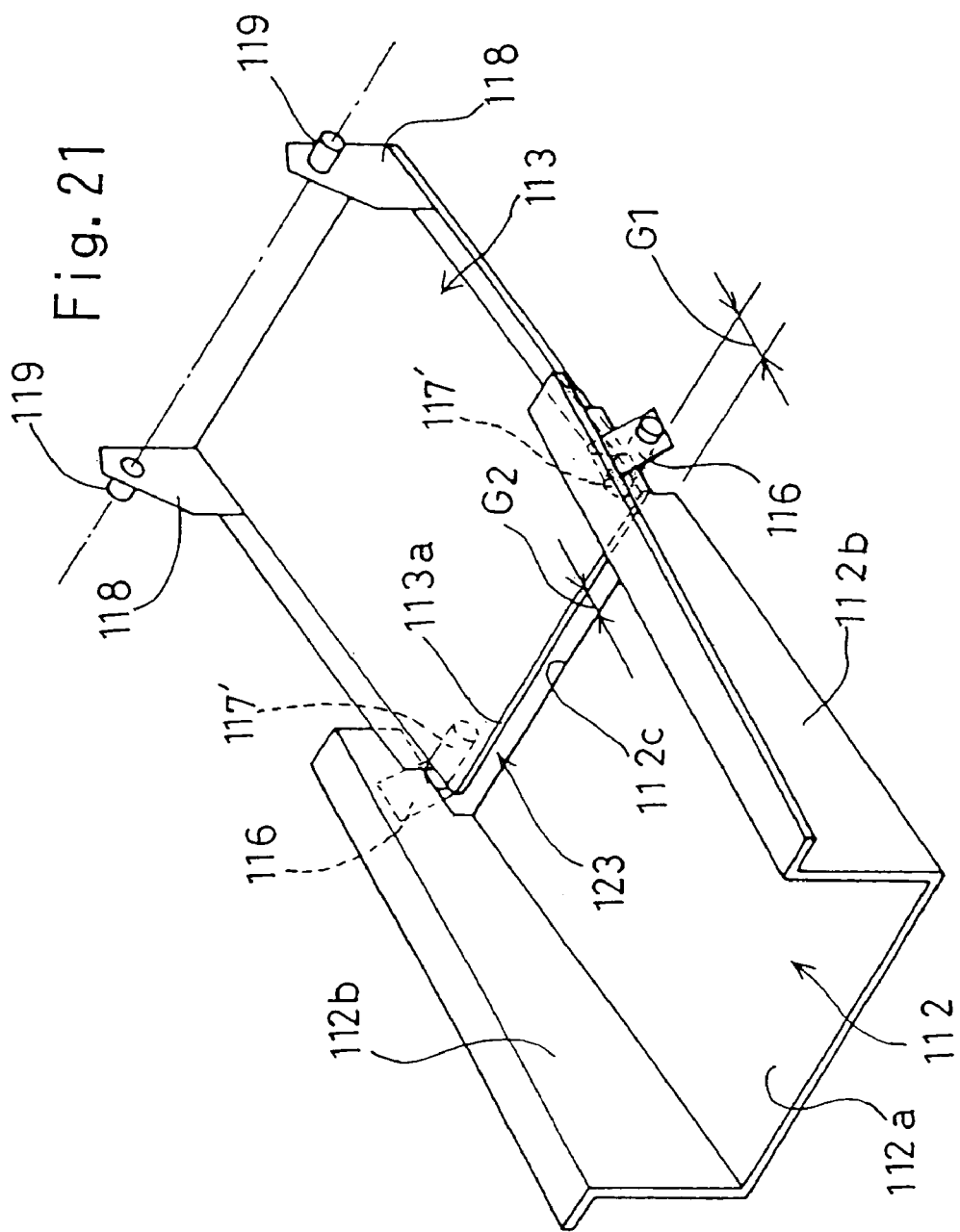
FIG. 21 is a schematic perspective view showing another example of positioning member.

FIG. 21 shows another example of positioning member. This example differs from the foregoing embodiment in that the plate 116 fixed to the projecting end of each side plate 112b of the lower duct member 112 is provided with an inwardly-projecting pin 117' which is in the form of a thin shaft circular in cross section. In this structure again, a gap G1 is defined between the rear edge 112c of the bottom plate 112a and each of the pins 117'. When the switching valve plate 113 is turned downward, the free end thereof (side end) on the mower unit 15 side is received in the frame portion 123 of the lower duct member 112 and supported on the paired pins 117', 117'. The inner surface of the bottom plate 112a of the lower duct member 112 and the obverse surface of the switching valve plate 113 are made flush with each other.

In such a structure, the paired pins 117' function as the positioning means similarly to the bar 117. Therefore, clogging of the discharge duct 21 due to the accumulation of turf grass is reliably prevented without impairing the deflector function of the switching valve plate 113.

The positioning member does not necessarily need to be circular in cross section but may be polygonal, for example. It is only necessary that the positioning member is so thin that turf grass cannot be rested thereon. Instead of mounting the positioning member to the lower duct member 112, the positioning member may be mounted to the side plates of the upper duct member 111. Although the lower duct member 112 is made pivotable up and down in the foregoing embodiments, the lower duct member 112 may be fixed to the upper duct member 111 or integral with the upper duct member.

Figure 22:
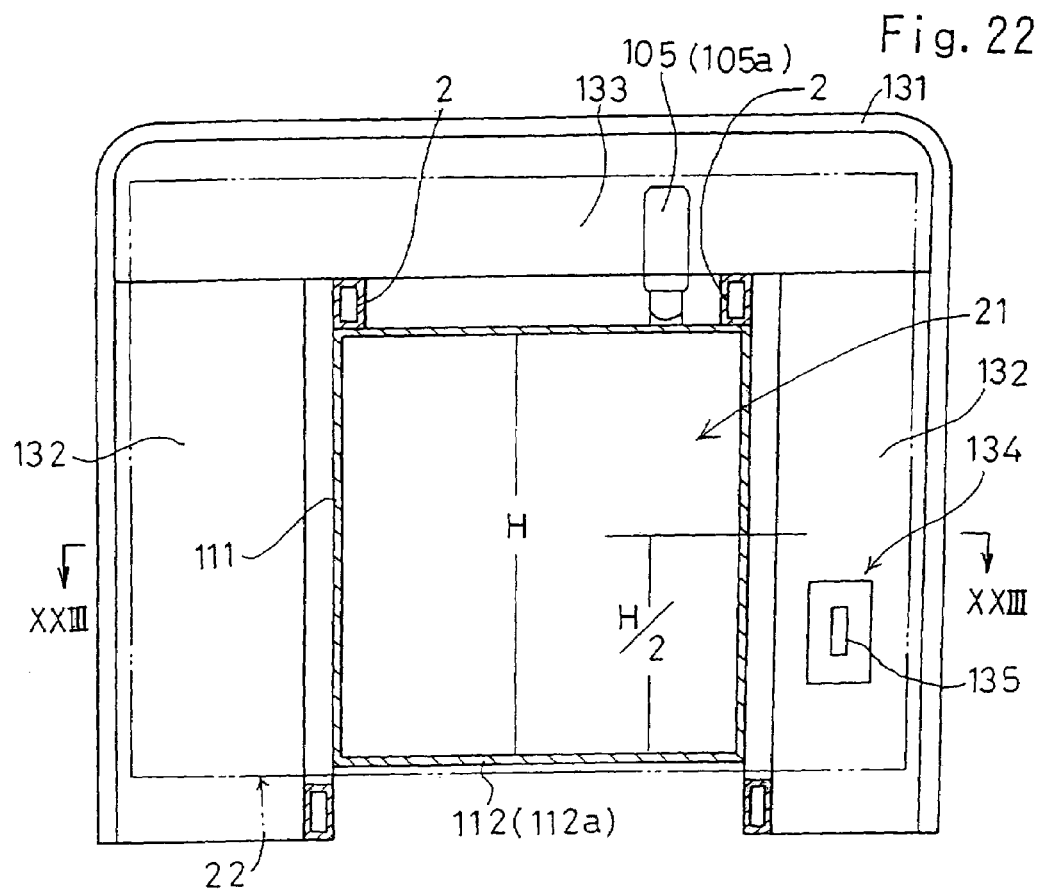
FIG. 22 is a sectional view taken along lines XXII-XXII in FIG. 4.
Figure 23:
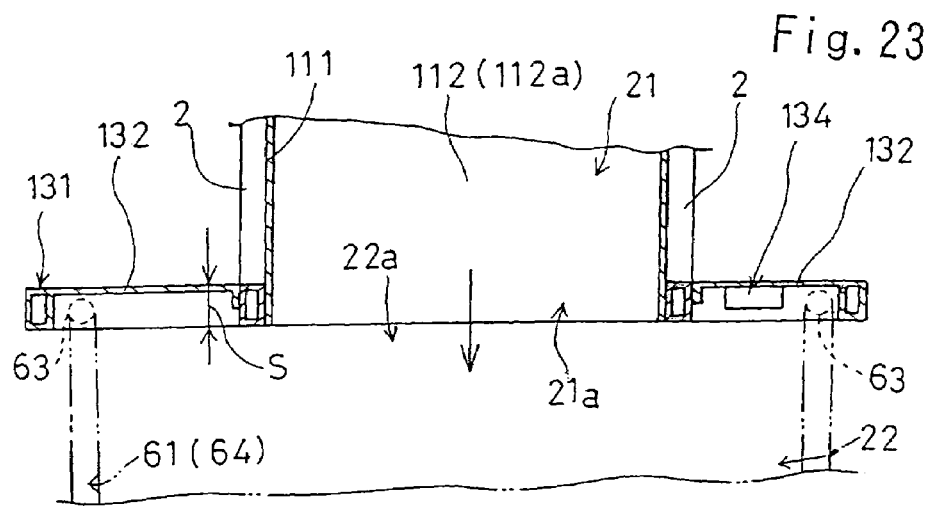
FIG. 23 is a sectional view taken along lines XXIII-XXIII in FIG. 22.

With reference to FIGS. 22 and 23, the structure of the rear end of the traveling body 1 will be described.

A gate-shaped frame 131 made by bending a hollow member is removably mounted to the body frame 2 by using e.g. bolts so as to surround the upper side and opposite sides of the discharge port 21a of the discharge duct 21.

A pair of plate members 132 is removably mounted, by using e.g. bolts, to the inside of the frame 131 so as to close the gap between each side surface of the upper duct member 111 and the frame. Similarly, a plate member 133 is removably mounted, by using e.g. bolts, to the inside of the frame so as to close the gap between the upper surface of the upper duct 111 and the frame 131.

The plate members 132, 132 and 133 are so set that, when the grass collection box 22 is in the forward, grass collection posture, the support frame 61 on the opposite sides of the introduction port 22a (opposite pair of support posts 63) comes into contact with the inner side of the frame 131.

As shown in FIG. 23, the plates 132, 132 and 133 are mounted to the front side of the frame 131 to be located anterior to the discharge port 21a of the discharge duct 21 by a predetermined distance S. The rear end of the rear cowl 8 is removably mounted to the frame 131.

With the above structure, the grass collection box 22 can be directly supported by the body frame 2. Further, the gate-shaped frame 131 reliably reinforces the periphery of the plate members 132, 132 and 133 with which the support posts 63 come into contact when the grass collection box 22 is in the forward, grass collection posture.

When the grass collection box 21 is in the grass collection posture, the discharge port 21a of the discharge duct 21 projects into the grass collection box 22 by the distance S. Therefore, turf grass mowed can be smoothly guided from the discharge duct 21 into the grass collection box 22 while preventing turf grass from escaping to the outside.

Since the frame 131 and the plate members 132, 132 and 133 are removable, the assembling and disassembling of these parts can be performed easily.

In this embodiment, either one of the plate members 132 on the opposite sides of the discharge duct 21 is provided with a turf grass sensor 134 for detecting the amount of turf grass accumulated in the grass collection box 22. When the turf grass sensor 134 detects that a predetermined amount of turf grass is accumulated in the grass collection box 22, the sensor notifies the operator accordingly, stops the mowing operation or causes the grass collection box 22 to shift to the complete discharge posture.

The turf grass sensor 134 is provided in the height range from the bottom surface of the discharge duct 21 (bottom plate 112a of the lower duct member 112) to the half of the height H of the discharge duct 21. With this arrangement, the detection of turf grass can be reliably performed. The contact 135 is arranged downward so that turf grass is not accumulated on the upper surface thereof.

The invention claimed is:

1. A traveling mower, comprising:

a traveling body provided with a mowing mechanism;

a grass collection box for storing grass mowed by the mowing mechanism, the grass collection box being pivotally connected to the traveling body so that it is switchable between a grass collection posture for receiving grass and a discharge posture for discharging grass to ground; and a manual operation member pivotable about a stationary axis arranged at the traveling body for switching the postures of the grass collection box; and an interlock mechanism for associating the grass collection box and the manual operation member with each other;

wherein the interlock mechanism includes switching means for increasing a turning angle of the grass collection box per unit operation angle of the manual operation memeber about the axis when the grass collection box is empty or substantially empty and that reduces the turning angle when the grass collection box contains much grass;

wherein the interlock mechanism includes:

an arm link for turning the grass collection box, and a connection pin to which a force from the manual operation member is applied, the arm link being formed with an elongated groove for movably receiving the connection pin; and wherein the connection pin is moved along the elongated groove by the switching means toward a rotation center of the arm link when the grass collection box is empty or substantially empty, the connection pin being moved along the elongated groove away from the rotation center of the arm link when the grass collection box contains much grass.

2. The traveling mower according to claim 1, wherein the grass collection box comprises a support frame providing a framework of the grass collection box, a support plate defining a bottom surface of the grass collection box, and a bag made of a net or cloth and covering the support frame and the support plate;

wherein an end of the support plate which is closer to an opening of the grass collection box is pivotably connected to the support frame, whereas another end of the support plate is connected to the support frame via a buffer which resists against the pivotal movement of the support plate.

3. The traveling mower according to claim 2, wherein the buffer comprises a spring having elasticity.

* * * * *